US008505784B2

(12) United States Patent
Trow et al.

(10) Patent No.: US 8,505,784 B2
(45) Date of Patent: Aug. 13, 2013

(54) FLUID DISPENSER AND A METHOD FOR ITS USE

(75) Inventors: David Andrew Trow, Hamilton (NZ); Paul Fleming Buckley, Auckland (NZ); Malcolm Norman Lynd, Auckland (NZ)

(73) Assignee: Forlong & Maisey Limited, Hamilton (NZ)

( * ) Notice: Subject to any disclaimer, the term of this patent is extended or adjusted under 35 U.S.C. 154(b) by 135 days.

(21) Appl. No.: 13/203,746

(22) PCT Filed: Feb. 26, 2010

(86) PCT No.: PCT/NZ2010/000035
§ 371 (c)(1),
(2), (4) Date: Aug. 29, 2011

(87) PCT Pub. No.: WO2010/098683
PCT Pub. Date: Sep. 2, 2010

(65) Prior Publication Data
US 2011/0315716 A1 Dec. 29, 2011

(30) Foreign Application Priority Data
Feb. 27, 2009 (NZ) ........................................ 575252

(51) Int. Cl.
*G01F 11/00* (2006.01)

(52) U.S. Cl.
USPC .............................. 222/323; 222/43; 222/386

(58) Field of Classification Search
USPC .................. 222/323, 324, 386, 387, 43, 519, 222/563
See application file for complete search history.

(56) References Cited

U.S. PATENT DOCUMENTS

| | | | | | |
|---|---|---|---|---|---|
| 2,284,533 | A * | 5/1942 | Neuman | ........................ | 222/260 |
| 4,020,838 | A * | 5/1977 | Phillips et al. | ................ | 604/184 |
| 4,227,650 | A | 10/1980 | McKinney | | |
| 4,245,757 | A * | 1/1981 | Phillips et al. | .................. | 222/43 |
| 4,359,050 | A * | 11/1982 | Reynolds | ....................... | 604/152 |
| 6,367,664 | B1 * | 4/2002 | Bunyan et al. | ................ | 222/324 |
| 6,554,161 | B2 * | 4/2003 | Main | ............................... | 222/43 |
| 6,637,664 | B1 | 10/2003 | Yoshigi et al. | | |
| 2004/0220527 | A1 * | 11/2004 | Buckley et al. | ............... | 604/191 |

FOREIGN PATENT DOCUMENTS

| | | |
|---|---|---|
| EP | 1818109 | 8/2007 |
| WO | WO2007/138084 | 12/2007 |

* cited by examiner

*Primary Examiner* — Kevin P Shaver
*Assistant Examiner* — Michael Melaragno
(74) *Attorney, Agent, or Firm* — Greer, Burns & Crain, Ltd.

(57) ABSTRACT

A valve operating mechanism for use in a fluid dispenser is described, wherein the fluid dispenser includes a reservoir for a fluid to be delivered, a fluid outlet for the reservoir, a piston configured to move through the reservoir, and an actuator for the piston, the valve operating mechanism including a valve, wherein the valve has an upstream side and a downstream side, and in at least one point of operation of the valve operating mechanism, the valve is inoperable as a consequence of the pressure difference between the upstream side of the valve and the downstream side of the valve.

30 Claims, 17 Drawing Sheets

FLUID DISPENSER AND A METHOD FOR ITS USE

TECHNICAL FIELD

The invention relates to an improved fluid dispenser.

The invention has particular application to fluid dispensers for use in animal husbandry such as drench guns and pour-on applicators.

However, persons skilled in the art will appreciate that the present invention has applications to industries other than animal husbandry. For example, the present invention may be used in the medical sciences, food, hospitality, and horticultural industries.

BACKGROUND ART

Fluid dispensers (or fluid applicators) such as drench guns or pour-on applicators are widely used in animal husbandry to deliver quantities of medicament or nutritional supplements to animals.

A typical drench gun consists of a chamber with a valve at either end. The inlet valve controls passage of fluid from a fluid reservoir to the drench gun, passing the liquid to be delivered into the barrel of the drench gun. When full or the desired amount of liquid is in the barrel, the operator activates a piston which forces the liquid from the barrel via an outlet valve.

A problem with this arrangement is that there can be inadvertent pressure applied to either the inlet or outlet valves which causes undesired leakage from the drench gun. The inlet and outlet valves are operable by fluid pressure. That is to say, passage of fluid past these valves requires an increase or decrease in fluid pressure which ideally is created by the user through actuation of the piston.

However, there can be occasions when the valves open due to undesired fluid pressure, resulting in fluid leakage.

Usually, this undesired fluid pressure causing the leakage is as a result of a "pressure pulse", which is sometimes also referred to as "water hammer". This phenomenon occurs when liquid supply is abruptly slowed or stopped as a result of the piston reaching its maximum or minimum displacement while the chamber is refilling.

The pressure pulse can cause one or both of the inlet and outlet valves to inadvertently open, allowing liquid to pass through the gun. This "pressure pulse" is also an issue in pour-on applicators and other fluid delivery devices.

Another source of undesired fluid pressure is when the drench gun is orientated in such a way that the reservoir supplying the liquid to the drench gun is raised above the drench gun in use.

Placing the reservoir higher than the drench gun is preferred, as gravity assists with the refilling of the drench gun. However, if the reservoir is too high, then the additional force of gravity acting on the fluid upstream of the inlet valve can cause the inlet valve to inadvertently open.

For example, when the reservoir is situated such that reservoir is higher than the drench gun outlet, there can be increased pressure on the valve of the drench gun when the drench gun is lowered or dropped by a user. For example, the user may be wearing a backpack reservoir.

Alternatively, if the reservoir is lower than the drench gun, then there is little risk of undesired pressure on the inlet valve, but then greater force is required to overcome gravity and refill the drench gun.

Although the leakage may be insignificant, it nonetheless is wasteful of the fluid being delivered. It also can mean that that an incorrect amount of liquid is being delivered to the animal. This can be a particular concern when medicaments are being delivered, as the animal may receive more than is desired.

The operator may also view the leakage as a fault with the drench gun, when in fact the drench gun is operating as it should.

Furthermore, an unexpected leakage can be messy with the fluid not being appropriately delivered to the animal, but elsewhere such as on the operator's clothes or on the ground.

To overcome this problem, it is common practice to use a relatively strong spring in the outlet valve. The valve is operable by fluid pressure acting on one side of the valve. When the pressure on the upstream side of the valve is greater than the downstream side, the valve opens.

It will be understood that the upstream side of the valve faces the direction of the fluid supply while the downstream side of the valve faces the nozzle.

The use of a spring to ensure the valve remains closed until fluid flow is desired, means that considerable force is required to be applied to the outlet valve in order overcome the spring sufficiently to allow liquid to pass. Thus, even though a pressure pulse may still occur, the force of the pulse is usually insufficient to cause the outlet valve open, thus the valve stays closed and prevents liquid from passing.

However, the use of a strong spring in the outlet valve means that a user must apply considerable force to operate the drench gun.

This can be a problem when the user needs to repeatedly deliver liquid in a short period of time, such as the case when dosing a herd of dairy cows. The user can quickly become fatigued when using the drench gun, and a repetitive strain injury can result.

This is especially the case if the fluid reservoir has been placed lower than the drench gun, as to overcome the effect of gravity on the fluid supply, a stronger handle spring is required, which must be biased by the user.

It is an object of the present invention to address the foregoing problems or at least to provide the public with a useful choice.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein, this reference does not constitute an admission that any of these documents form part of the common general knowledge in the art, in New Zealand or in any other country.

Further aspects and advantages of the present invention will become apparent from the ensuing description which is given by way of example only.

DISCLOSURE OF THE INVENTION

Embodiment One

According to one aspect of the present invention, there is provided a valve operating mechanism for use in a fluid dispenser, wherein the fluid dispenser includes a reservoir for a fluid to be delivered, and an fluid outlet for the reservoir, and a piston configured to move through the reservoir, and an actuator for the piston, the valve operating mechanism including a valve, wherein the valve has an upstream side and a downstream side, and characterised in that in at least one point of operation of the valve operating mechanism, the valve is inoperable as a consequence of the pressure difference between the upstream side of the valve and the downstream side of the valve.

According to another aspect of the present invention, there is provided a fluid dispenser, wherein the fluid dispenser includes a reservoir for a fluid to be delivered, and an fluid outlet for the reservoir, and a piston configured to move through the reservoir, and an actuator for the piston, the fluid dispenser also including a valve operating mechanism, and a valve, wherein the valve has an upstream side and a downstream side, and characterised in that in at least one point of operation of the valve operating mechanism, the valve is inoperable as a consequence of the pressure difference between the upstream side of the valve and the downstream side of the valve.

According to another aspect of the present invention, there is provided a method of operating a fluid dispenser, wherein the fluid dispenser includes;

a reservoir for a fluid to be delivered, and an fluid outlet for the reservoir, and a valve, wherein the valve has an upstream side and a downstream side, and a valve operating mechanism, and a piston configured to move through the reservoir, and an actuator for the piston, the method characterised by the steps of:

a) filling the reservoir with a fluid, and b) actuating the piston such that the piston moves through the reservoir to force the fluid out of the fluid outlet, wherein in at least one point of operation of the valve operating mechanism, the valve is inoperable as a consequence of the pressure difference between the upstream side of the valve and the downstream side of the valve.

The fluid may be any flowable substance such as water or food condiments, but preferably is a liquid medicament or nutritional supplement.

A dispenser should be understood to mean any apparatus configured to dispense liquid. For example, the fluid dispenser may be a syringe.

Preferably, the fluid dispenser is a drench gun, and shall be referred to as such throughout the remainder of this specification. However, a person skilled in the art shall appreciate that the present invention is not limited to use with drench guns and may be used in fluid applicators, such as a pour-on applicator, or in other apparatus with suitable modifications.

Drench guns typically include a barrel containing fluid to be delivered and a piston configured to pass through the barrel, said piston being provided with a piston head which seals one end of the barrel. Usually, the opposing end of the barrel is sealed by an outlet valve. Thus, the outlet valve and piston head defines a chamber for the fluid which is to be dispensed.

The drench gun may be provided with a fluid supply, which typically is piping connected to a fluid reservoir.

The head of the piston usually has a fluid conduit, to allow fluid to pass into the chamber from the fluid reservoir. The head of the piston will often include an inlet valve which controls the entry of fluid into the chamber.

The drench gun usually includes an actuator for the piston in the form of a handle or trigger. Reference shall be made throughout the remainder of the specification to the actuator as a being a handle.

In this embodiment, a portion of the handle is linked to the shaft of the piston, such that when the handle is squeezed or otherwise manipulated, the piston displaces any fluid in the chamber.

The drench gun may also include a housing containing additional components, such as a dosage selector. The dosage selector allows the user to control the amount of fluid to be delivered to the animal to be treated.

A valve should be understood to mean a member which is used to control the flow of a fluid. A valve includes a body which seals against a valve seat when the valve is closed.

The valve should be understood to have an upstream side and a downstream side.

The upstream side of the valve should be understood to mean the side of the valve which faces the fluid supply. The downstream side of the valve should be understood to mean the side of the valve which faces the barrel or exit from the barrel of the fluid dispenser.

The valve operating mechanism should be understood to mean any mechanical means configured to operate a valve which is separate to the valve. Some valves used in fluid dispensers may include a spring. It should be understood for these sprung valves, the spring forms part of the valve, and thus is not separate to the valve.

Persons skilled in the art will appreciate that conventional valves are operable by the pressure differences between the upstream side of the valve and the downstream side of the valve. When the pressure on the upstream side of the valve exceeds the atmospheric or fluid pressure on the downstream side of the valve, the valve opens allowing passage of fluid past the valve.

The operation of the valve should be understood to mean any one or more of the following actions: opening, closing, locking the valve in either an open or closed position so that fluid pressure cannot act upon the valve, or substantially altering the preset fluid pressure which opens the valve.

It should be understood that in the following discussion, the valve operating mechanism acts upon the inlet valve of the drench gun. However, persons skilled in the art will appreciate that with suitable modifications as discussed later in this specification, the valve operating mechanism of the present invention may also be used with the outlet valve of the drench gun.

In some embodiments of the present invention, the drench gun may be provided with two chambers.

In this embodiment of the invention, a first chamber may be formed by the interior of the dosage selector housing and a first side of the piston head.

A second chamber may be formed by a second side of the piston head and an outlet valve.

Although the various components defining the chamber may vary according to the particular type of drench gun, it should be understood that the piston head generally defines a sealed wall between the two chambers.

The fluid in the first chamber, which is supplied by the fluid reservoir, flows into the second chamber via a conduit and valve in the drench gun housing or via a conduit and valve in the piston head. Usually, the fluid exits the drench gun via the outlet valve at the far end of the second chamber.

In preferred embodiments of the present invention, the valve operating mechanism is operable by the handle of the drench gun.

In preferred embodiments of the invention, the handle of the drench gun is configured to have at least two ranges of movement.

This should be understood to mean that a partial squeeze of the handle may only cause a first range of movement, and a full squeeze of the handle will be required to cause the handle to go through the first range of movement and then a second (or more) range of movement.

Preferably, the first range of movement closes (or opens, depending on the requirements of the user) the inlet valve of the drench gun, and the second range of movement displaces the piston. In at least one of the ranges of movement, the pressure difference between the upstream side of the valve and the downstream side of the valve prevents the opening of the inlet valve.

However, a person skilled in the art will appreciate that this arrangement may be reversed such that the first range of movement displaces the piston, and the second range of movement closes (or opens, depending on the requirements of the user) the inlet valve.

Furthermore, persons skilled in the art will appreciate that with suitable modifications, the handle may only have a single range of movement, with another component providing a separate movement to operate the valve.

Preferably, the handle is a two part assembly, pivotally linked at one end of each part and axially linked. A first portion of the handle assembly is fixed relative to the dosage selector housing. A second portion of the handle is linked to the shaft of the piston, and is moveable relative to the first portion of the handle and dosage selector housing.

Preferably, the handle is biased by a spring, which forces the two parts of the handle apart. This spring shall now be referred to throughout the remainder of the specification as being the handle spring.

To move the piston, and thus displace any fluid in the chamber, the user must apply force to the handle to overcome the biasing force of the handle spring to bring the two parts of the actuator together.

The piston head, being linked to the moveable portion of the handle via the piston shaft, is moved through the barrel. As the head of the piston defines one wall of the chamber, and the other wall is fixed, the chamber becomes reduced in size. This forces the fluid in the chamber to exit via the outlet valve.

In preferred embodiments of the present invention, the shaft of the piston includes a piston sleeve linked to the handle, the piston sleeve being slideably moveable relative to the piston shaft.

However, persons skilled in the art will appreciate that in some embodiments of the present invention, an elongate rod or similar member may be used instead of a piston sleeve. Reference shall now be made throughout the remainder of this specification to the piston sleeve as being a sleeve.

The sleeve may be linked to the handle in a number of ways. For example, the handle spring may pass through the sleeve and be fixed to the piston shaft. Alternatively, the handle spring may be fixed to the sleeve. The sleeve is provided with a stop on its internal surfaces which engages with a portion of the piston shaft once the sleeve has been moved through a first range of movement.

Alternatively, the handle may be connected to the sleeve rather than the piston. Once moved a certain distance, a portion of the sleeve engages with the piston. By continuing movement of the handle, the user will move both the sleeve and the piston.

Persons skilled in the art will appreciate that other ways of linking the sleeve to the piston shaft such that one of the sleeve or piston shaft has a degree of independent movement relative to the other is readily envisaged.

Preferably, one end of the sleeve is biased by a spring. This spring shall now be referred throughout the remainder of the specification as the sleeve spring. The sleeve spring provides a biasing force which is independent of the handle spring.

Preferably, the portion of the sleeve proximate to the piston head is configured to engage with a biasing means for the inlet valve. The biasing means forms part of the valve operating mechanism.

In preferred embodiments of the present invention, the sleeve is configured with a ring circumscribing the sleeve. It will be appreciated that a ring surrounding the entire sleeve allows a more even distribution of forces when it contacts the biasing means for the inlet valve.

However, persons skilled in the art will appreciate that only a small portion of the sleeve need engage with the biasing means for the inlet valve, and thus a nub or similar protuberance will also fulfil this function.

Preferably, the sleeve activates the biasing means for the inlet valve when the actuator passes through the first range of movement. However, persons skilled in the art will appreciate that this is not meant to be limiting, and depending on the requirements of the user, the activation of the biasing means may occur during the second range of movement of the handle.

Preferably, the biasing means for the inlet valve is pivotally mounted to the shaft of the piston, behind the piston head. For example, the biasing means may be a protuberance or nub extending away from the shaft of the piston.

Preferably, the biasing means is a pivot lever mounted to the piston shaft via pivot points on a portion of the piston shaft. Alternatively, the pivot lever may be mounted to the piston shaft via an axle passing through a portion of the piston shaft. Reference shall now be made throughout the remainder of the specification to the biasing means for the inlet valve as being a pivot lever.

However, in some embodiments of the present invention, the biasing means may be a lever passing through a plastic or metal ball fitted into an appropriately shaped housing or recess in the piston shaft. In this embodiment of the invention, an O-ring may be used to seal the ball in the housing.

The pivot lever should be understood to mean a member substantially complementary to the profile of the piston shaft, but with a portion of the pivot lever extending substantially perpendicular to the piston shaft.

In preferred embodiments of the present invention, a portion of the piston shaft is recessed or cut-out, the pivot lever fitting substantially within the recess or cut-out. This reduces the profile of the pivot lever, and also ensures that the pivot lever does not come into undesired contact with any part of the housing of the drench gun.

The pivot lever includes a pin extending perpendicular to the piston shaft, with a first end of the pin configured to engage with the housing when the sleeve is passing through a first range of movement and engaged with the sleeve when the sleeve is passing through a second range of movement.

The opposing end of the pin passes through the piston shaft wall, and engages with the inlet valve.

In preferred embodiments of the present invention, the pin is a separate component to the pivot lever. However, in some embodiments of the present invention the pin may be integrated into the pivot lever as a one piece moulding of plastics material.

Preferably, a portion of the drench gun is configured to engage with the pin.

In preferred embodiments of the present invention, the pin engages with a portion of the dosage selector or its housing. For example, the pin may engage with the end of the dosage selector or with the internal surface of the dosage selector housing.

Alternatively, the pin may engage with another component of the drench gun. Persons skilled in the art will appreciate that the drench gun may be moulded with a specialised protuberance or nub for this purpose.

Preferably, the pivot lever is configured to bias against the inlet valve when the sleeve contacts the pin. The axle of the pivot lever allows it to move relative to the piston shaft.

In some embodiments of the present invention, the pivot lever may include a diaphragm where the pin passes through the piston shaft wall. This seals the pin in the piston shaft, while still allowing the pin a degree of movement.

It should be appreciated that in this embodiment of the invention, the valve operating mechanism includes the handle of the drench gun, the sleeve, and the pivot lever. It is these parts of the mechanism engaging with the drench gun housing/dosage selector and piston which ensures that in a closed position, fluid pressures of a magnitude normally experienced by the valve cannot cause the valve to open.

In use, the inlet valve is closed when the pin of the pivot lever biases against the inlet valve, keeping the inlet valve firmly seated. This is the default position for the pivot lever when the handle is at rest, and prevents any passage of fluid through the valve When at rest, the pivot lever is biased against the inlet valve due to the pin of the pivot lever making contact with a portion of the dosage selector housing.

A portion of the handle is linked to the sleeve. When the handle is squeezed by the user, the sleeve is moved along the same axis as the piston shaft.

The range of movement of the sleeve is limited, no more than 2.5 mm to 5 mm, although a person skilled in the art will appreciate that the movement of the sleeve may vary according to the requirements of the user and the particular configuration of the biasing means.

The front end of the sleeve biases against the pivot lever when the sleeve is displaced. Then, as the user continues to manipulate the handle (bringing the two portions of the handle together), the piston is displaced. The sleeve continues to bias against the pivot lever, holding the inlet valve against its seat, ensuring that no fluid can pass.

When the chamber is empty, having discharged the stored liquid through the outlet valve, the user will relax their grip on the handle. The biasing force of the handle spring forces the two parts of the handle apart. This action draws the piston and sleeve away from the outlet valve. The sleeve also ceases contact with the pivot lever, releasing the inlet valve from its seat, and allowing the inlet valve to open.

The withdrawal of the piston causes a partial vacuum in the chamber, drawing fluid through the inlet valve due to the pressure difference between the upstream side and downstream side of the valve. In the meantime, the outlet valve closes due to its elastomeric properties (or spring, if the outlet valve is a sprung valve). This is the refill phase of the drench gun operation.

Should the user pause during the refill phase, the sleeve spring biases against the piston to continue movement until it reaches the limit of travel of the sleeve (2.5 mm to 5 mm). This causes the pivot lever to contact the sleeve, thus closing the inlet valve. This prevents fluid flow into the chamber.

When the refilling is restarted, the piston will continue to withdraw until the movement is stopped by the pivot lever contacting a portion of the dosage selector housing of the drench gun. The pin of the pivot lever contacts the inlet valve, forcing the valve against its seat, thus causing the inlet valve to close and inoperable to pressure. The inlet valve cannot be inadvertently opened unless the piston, and therefore the pivot lever and its pin, is displaced.

The closure of the inlet valve may cause a sudden deceleration of fluid passing through the supply lines supplying the fluid to the drench gun. This may cause a pressure pulse.

However, because the inlet valve is now closed and unable to be biased by fluid pressure, so there is no leakage, and therefore wastage, of fluid.

This means that the spring which biases the outlet valve may now be reduced in strength. The spring no longer has to be strong enough to withstand the pressure pulse, as the operating mechanism prevents transmission of the pressure pulse to the fluid in the chamber.

Essential to the invention is the two ranges of movement afforded by having the sleeve slideably moveable relative to the piston shaft. However, persons skilled in the art will appreciate that other methods of forming a drench gun with two ranges of movement are envisaged.

In particular, persons skilled in the art will appreciate that the components of the present invention may be repackaged. For example, the inlet valve may be situated in or adjacent to the fluid conduit of the fluid applicator, rather than the conventional position of in or adjacent to the piston head.

For example, an alternative arrangement to that previously described, utilises, instead of a handle spring, an applicator provided with a biasing means inside the barrel of the applicator, with the handle being fixed to the piston shaft or sleeve.

Preferably, in this embodiment of the invention, the biasing means is an expansion spring. This expansion spring shall now be referred to as the barrel spring. In this alternative embodiment, the barrel spring biases against the piston head.

Preferably, disposed between the piston head and the sleeve is a secondary biasing means. This may be an elastomer bung or similar resilient member, but preferably is a spring.

This secondary spring, which is smaller than the barrel spring, biases against the piston head and the sleeve to bias these components apart. When these components are apart, this allows flow of fluid into the barrel of the applicator. The secondary spring, which shall now be referred to as the inlet valve spring, is weaker than the barrel spring.

In a rest position, the expansion spring in the barrel will override the inlet valve spring biasing the sleeve, which keeps the inlet valve closed independent of fluid pressure.

Upon operation of the handle, fluid is dispensed through the nozzle from the barrel of the applicator as per normal.

However, upon release of the handle, the inlet valve spring biases against the sleeve, allowing the pressure difference between the upstream side of the inlet valve and the downstream side of the inlet valve to open the inlet valve, thus refilling the chamber. When movement of the sleeve is stopped (by the housing of the drench gun), the inlet valve progressively closes as the piston head reaches the end of its movement.

The applicants have found that this alternative embodiment is particularly effective in preventing a pressure pulse caused by an elevated fluid supply from passing through the inlet valve.

A weaker spring or valve construction may be used at the outlet valve, meaning less force is required to be exerted by the user to overcome the outlet valve.

The applicants have devised a number of alternative valve operating mechanisms, which are now described. These alternatives share a number of features of the embodiment previously described, unless otherwise specified.

Embodiment Two

According to one aspect of the present invention, there is provided a valve operating mechanism for use in a fluid dispenser, wherein the fluid dispenser includes a reservoir for a fluid to be delivered, and an fluid outlet for the reservoir, and a piston configured to move through the reservoir, and an actuator for the piston, the valve operating mechanism including a valve, and characterised in that in at least one point of operation of the valve operating mechanism, the valve is inoperable as a consequence of the movement of the reservoir relative to the valve.

According to another aspect of the present invention, there is provided a fluid dispenser, wherein the fluid dispenser includes a reservoir for a fluid to be delivered, and an fluid outlet for the reservoir, and a piston configured to move through the reservoir, and an actuator for the piston, the fluid dispenser also including a valve operating mechanism, and a valve, and characterised in that in at least one point of operation of the valve operating mechanism, the valve is inoperable as a consequence of the movement of the reservoir relative to the valve.

According to another aspect of the present invention, there is provided a method of operating a fluid dispenser, wherein the fluid dispenser includes;

a reservoir for a fluid to be delivered, and an fluid outlet for the reservoir, and a valve, and a valve operating mechanism, and a piston configured to move through the reservoir, and an actuator for the piston, the method characterised by the steps of:

a) filling the reservoir with a fluid, and b) actuating the piston such that the piston moves through the reservoir to force the fluid out of the fluid outlet, wherein in at least one point of operation of the valve operating mechanism, the valve is inoperable as a consequence of the movement of the reservoir relative to the valve.

The fluid may be any flowable substance such as water or food condiments, but preferably is a liquid medicament or nutritional supplement.

A dispenser should be understood to mean any apparatus configured to dispense liquid. For example, the fluid dispenser may be a syringe.

Preferably, the fluid dispenser is a drench gun, and shall be referred to as such throughout the remainder of this specification. However, a person skilled in the art shall appreciate that the present invention is not limited to use with drench guns and may be used in fluid applicators, such as a pour-on applicator, or in other apparatus with suitable modifications.

Drench guns typically include a barrel containing fluid to be delivered and a piston configured to pass through the barrel, said piston being provided with a piston head which seals one end of the barrel. Usually, the opposing end of the barrel is sealed by an outlet valve. Thus, the outlet valve and piston head defines a chamber for the fluid which is to be dispensed.

The drench gun may be provided with a fluid supply, which typically is piping connected to a fluid reservoir.

The head of the piston usually has a fluid conduit, to allow fluid to, pass into the chamber from the fluid reservoir. The head of the piston will often include an inlet valve which controls the entry of fluid into the chamber.

The drench gun usually includes an actuator for the piston in the form of a handle or trigger. Reference shall be made throughout the remainder of the specification to the actuator as a being a handle.

In this embodiment, a portion of the handle is linked to the shaft of the piston, such that when the handle is squeezed or otherwise manipulated, the piston displaces any fluid in the chamber.

The drench gun may also include a housing containing additional components, such as a dosage selector. The dosage selector allows the user to control the amount of fluid to be delivered to the animal to be treated.

A valve should be understood to mean a member which is used to control the flow of a fluid. A valve includes a body which seals against a valve seat when the valve is closed.

The valve should be understood to have an upstream side and a downstream side.

The upstream side of the valve should be understood to mean the side of the valve which faces the fluid supply. The downstream side of the valve should be understood to mean the side of the valve which faces the barrel or exit from the barrel of the fluid dispenser.

The valve operating mechanism should be understood to mean any mechanical means configured to operate a valve which is separate to the valve. Some valves used in fluid dispensers may include a spring. It should be understood for these sprung valves, the spring forms part of the valve, and thus is not separate to the valve.

Persons skilled in the art will appreciate that conventional valves are operable by the pressure differences between the upstream side of the valve and the downstream side of the valve. When the pressure on the upstream side of the valve exceeds the atmospheric or fluid pressure on the downstream side of the valve, the valve opens allowing passage of fluid past the valve.

The operation of the valve should be understood to mean any one or more of the following actions: opening, closing, locking the valve in either an open or closed position so that fluid pressure cannot act upon the valve, or substantially altering the preset fluid pressure which opens the valve.

It should be understood that in the following discussion, the valve operating mechanism acts upon the inlet valve of the drench gun. However, persons skilled in the art will appreciate that with suitable modifications as discussed later in this specification, the valve operating mechanism of the present invention may also be used with the outlet valve of the drench gun.

In some embodiments of the present invention, the drench gun may be provided with two chambers.

In this embodiment of the invention, a first chamber may be formed by the interior of the dosage selector housing and a first side of the piston head.

A second chamber may be formed by a second side of the piston head and an outlet valve.

Although the various components defining the chamber may vary according to the particular type of drench gun, it should be understood that the piston head generally defines a sealed wall between the two chambers.

The fluid in the first chamber, which is supplied by the fluid reservoir, flows into the second chamber via a conduit and valve in the drench gun housing or via a conduit and valve in the piston head. Usually, the fluid exits the drench gun via the outlet valve at the far end of the second chamber.

In preferred embodiments of the present invention, the valve operating mechanism is operable by the handle of the drench gun.

In preferred embodiments of the invention, the handle of the drench gun is configured to have at least two ranges of movement.

This should be understood to mean that a partial squeeze of the handle may only cause a first range of movement, and a full squeeze of the handle will be required to cause the handle to go through the first range of movement and then a second (or more) range of movement.

Preferably, the first range of movement closes (or opens, depending on the requirements of the user) the inlet valve of the drench gun, and the second range of movement displaces the piston. In at least one of the ranges of movement, the pressure difference between the upstream side of the valve and the downstream side of the valve prevents the opening of the inlet valve.

However, a person skilled in the art will appreciate that this arrangement may be reversed such that the first range of movement displaces the piston, and the second range of movement closes (or opens, depending on the requirements of the user) the inlet valve.

Furthermore, persons skilled in the art will appreciate that with suitable modifications, the handle may only have a single range of movement, with another component providing a separate movement to operate the valve.

Preferably, the handle is a two part assembly, pivotally linked at one end of each part and axially linked. A first portion of the handle assembly is fixed relative to the dosage selector housing. A second portion of the handle is linked to the shaft of the piston, and is moveable relative to the first portion of the handle and dosage selector housing.

Preferably, the handle is biased by a spring, which forces the two parts of the handle apart. This spring shall now be referred to throughout the remainder of the specification as being the handle spring.

To move the piston, and thus displace any fluid in the chamber, the user must apply force to the handle to overcome the biasing force of the handle spring to bring the two parts of the actuator together.

The piston head, being linked to the moveable portion of the handle via the piston shaft, is moved through the barrel. As the head of the piston defines one wall of the chamber, and the other wall is fixed, the chamber becomes reduced in size. This forces the fluid in the chamber to exit via the outlet valve.

In this embodiment of the invention, instead of a sleeve surrounding a piston, the drench gun may be provided with two barrels.

In this embodiment of the invention, there is provided an inner barrel, which will contain the fluid being delivered, and an outer barrel, through which fluid exits the drench gun.

The inner barrel is slideably moveable relative to the outer barrel, and may be thought of as the reservoir.

Preferably, the inner barrel has a limited range of travel relative to the outer barrel.

The outer barrel may be thought of as a casing for the inner barrel, and is not necessarily intended to contain or conduct fluid other than through its nozzle.

For example, the outer barrel may be provided with apertures or openings along its length so that the user may more easily view the contents of the inner barrel. Alternatively, the outer barrel may be a transparent construction.

Preferably, the inner barrel includes a conduit through which, fluid enters a portion of the outer barrel.

Preferably, the outer barrel is provided with a conduit through which fluid passes when exiting the inner barrel.

Preferably, the inner barrel is provided with an outlet valve at the conduit end of the barrel. The outlet valve is preferably biased by a spring or a similar member.

Preferably, the outer barrel includes on its inner surface a pin, or a similar construction which would be readily apparent to a person skilled in the art, which is provided to engage with the conduit, and thus the outlet valve, of the inner barrel.

In a preferred embodiment, when at rest, there is a small clearance between the outlet valve and the pin of the outer barrel. This allows the inner barrel to move slightly, thus absorbing a pressure pulse, without biasing open the outlet valve.

However, persons skilled in the art will appreciate that in some embodiments, the pin and outlet valve may be in contact according to the requirements of the user.

For example, the spring may be sufficiently strong enough to absorb the pressure pulse without the outlet valve biasing open. Of course, this may mean greater force is required to be applied by the user in order to bias open the spring.

Preferably, surrounding the external surface of the inner barrel is a seal in the form of an O-ring which may provide some frictional resistance as the piston initially moves. Persons skilled in the art will appreciate that the space between the inner and outer barrels may be sealed using other methods, such as a diaphragm.

The seal is to help prevent inadvertent forward movement of the inner barrel should there be a sudden increase in fluid pressure (pressure pulse) from the fluid supply. This seal also ensures that fluid does not travel backwards in the space between the sides of the inner and outer barrel.

When the inner barrel moves relative to the outer barrel in a first range of movement, through actuation of the piston, the outlet valve of the inner barrel contacts the pin of the outer barrel as the clearance between the outlet valve and pin is reduced. The outlet valve remains closed and inoperable as a result of fluid pressure.

A second range of movement causes the outlet valve to bias against the pin. As the outlet valve of the inner barrel is prevented from moving further forward by the pin, the continued movement of the inner barrel relative to the outlet valve opens the valve. This allows the fluid contained within the inner barrel to pass through the outlet valve and out the nozzle of the outer barrel.

The outlet valve will remain in contact with the pin until the piston begins returning to a rest position.

When the piston begins its initial movement when returning to a rest position, the inner barrel will also move away from the pin, thus releasing (and closing) the outlet valve.

When the piston is fully retracted to its rest position, the piston makes contact with protuberances on the inner barrel. These protuberances prevent the inner barrel from moving forward independently of the piston.

In preferred embodiments, the inner barrel contacts the body of the applicator when at rest. In some embodiments, the inner barrel may stop against the dosage selector of the application. In other embodiments, the body of the applicator may be provided with tabs against which the rear of the inner barrel may rest.

Persons skilled in the art will appreciate that the present embodiment of the invention may be modified according to the requirements of the user.

For example, in yet another embodiment of the present invention, the inner barrel may be restrained by the outlet valve instead of the applicator body.

In this embodiment, the outlet valve includes a body and a sealing surface. The sealing surface should be understood to mean the portion of the valve which seals an aperture to prevent fluid from passing through the aperture.

Preferably, the body of the outlet valve is slightly elongated and tapered. The outlet valve is fixed to the outer barrel, and passes through the outlet of the inner barrel with the sealing surface of the valve held against the interior of the outlet of the inner barrel.

In an alternative arrangement, a spring mounted to the outer barrel biases against the inner barrel in order to keep the barrels apart. Actuation of the piston will cause a first movement of the inner barrel relative to the outer barrel so that the outlet valve is no longer locked against the inner barrel.

A second movement of the inner barrel or an increase in fluid pressure will allow fluid past the valve and out the nozzle of the applicator.

In yet another arrangement, the outlet valve may be situated in the nozzle of the applicator, connected to the inner barrel via a wire. Displacement of the inner barrel relative to the outer barrel causes the wire to move, thus opening the outlet valve.

It will be appreciated that configuring the applicator with a dual barrel arrangement wherein the outlet valve is disposed between the barrels but requiring physical displacement of the inner barrel to be actuated provides a valve actuating mechanism which is independent of fluid pressure.

Thus, although a pressure pulse may be caused when the piston has completed its cycle, the outlet valve is able to remain closed, and cannot be biased open by fluid pressure.

Embodiment Three

According to one aspect of the present invention, there is provided a valve operating mechanism for use in a fluid dispenser, wherein the fluid dispenser includes a reservoir for a fluid to be delivered, and an fluid outlet for the reservoir, and a piston configured to move through the reservoir, and an actuator for the piston, the valve operating mechanism including a valve, and characterised in that the reservoir includes an elongate member which slideably engages with the piston at one end, and engages with the valve at an opposing end, wherein in at least one point of operation of the valve operating mechanism, the valve is inoperable as a consequence of the movement of the elongate member relative to the valve.

According to one aspect of the present invention, there is provided a fluid dispenser, wherein the fluid dispenser includes a reservoir for a fluid to be delivered, and an fluid outlet for the reservoir, and a piston configured to move through the reservoir, and an actuator for the piston, the fluid dispenser also including a valve operating mechanism, and a valve, and characterised in that the reservoir includes an elongate member which slideably engages with the piston at one end, and engages with the valve at an opposing end, wherein in at least one point of operation of the valve operating mechanism, the valve is inoperable as a consequence of the movement of the elongate member relative to the valve.

According to one aspect of the present invention, there is provided a method of operating a fluid dispenser, wherein the fluid dispenser includes;

a reservoir for a fluid to be delivered, and an fluid outlet for the reservoir, and a valve, and a valve operating mechanism, and a piston configured to move through the reservoir, and an actuator for the piston, the method characterised by the steps of:

a) filling the reservoir with a fluid, and b) actuating the piston such that the piston moves through the reservoir to force the fluid out of the fluid outlet, the reservoir includes an elongate member which slideably engages with the piston at one end, and engages with the valve at an opposing end, wherein in at least one point of operation of the valve operating mechanism, the valve is inoperable as a consequence of the movement of the elongate member relative to the valve.

The fluid may be any flowable substance such as water or food condiments, but preferably is a liquid medicament or nutritional supplement.

A dispenser should be understood to mean any apparatus configured to dispense liquid. For example, the fluid dispenser may be a syringe.

Preferably, the fluid dispenser is a drench gun, and shall be referred to as such throughout the remainder of this specification. However, a person skilled in the art shall appreciate that the present invention is not limited to use with drench guns and may be used in fluid applicators, such as a pour-on applicator, or in other apparatus with suitable modifications.

Drench guns typically include a barrel containing fluid to be delivered and a piston configured to pass through the barrel, said piston being provided with a piston head which seals one end of the barrel. Usually, the opposing end of the barrel is sealed by an outlet valve. Thus, the outlet valve and piston head defines a chamber for the fluid which is to be dispensed.

The drench gun may be provided with a fluid supply, which typically is piping connected to a fluid reservoir.

The head of the piston usually has a fluid conduit, to allow fluid to pass into the chamber from the fluid reservoir. The head of the piston will often include an inlet valve which controls the entry of fluid into the chamber.

The drench gun usually includes an actuator for the piston in the form of a handle or trigger. Reference shall be made throughout the remainder of the specification to the actuator as a being a handle.

In this embodiment, a portion of the handle is linked to the shaft of the piston, such that when the handle is squeezed or otherwise manipulated, the piston displaces any fluid in the chamber.

The drench gun may also include a housing containing additional components, such as a dosage selector. The dosage selector allows the user to control the amount of fluid to be delivered to the animal to be treated.

A valve should be understood to mean a member which is used to control the flow of a fluid. A valve includes a body which seals against a valve seat when the valve is closed.

The valve should be understood to have an upstream side and a downstream side.

The upstream side of the valve should be understood to mean the side of the valve which faces the fluid supply. The downstream side of the valve should be understood to mean the side of the valve which faces the barrel or exit from the barrel of the fluid dispenser.

The valve operating mechanism should be understood to mean any mechanical means configured to operate a valve which is separate to the valve. Some valves used in fluid dispensers may include a spring. It should be understood for these sprung valves, the spring forms part of the valve, and thus is not separate to the valve.

Persons skilled in the art will appreciate that conventional valves are operable by the pressure differences between the upstream side of the valve and the downstream side of the valve. When the pressure on the upstream side of the valve exceeds the atmospheric or fluid pressure on the downstream side of the valve, the valve opens allowing passage of fluid past the valve.

The operation of the valve should be understood to mean any one or more of the following actions: opening, closing, locking the valve in either an open or closed position so that fluid pressure cannot act upon the valve, or substantially altering the preset fluid pressure which opens the valve.

It should be understood that in the following discussion, the valve operating mechanism acts upon the inlet valve of the drench gun. However, persons skilled in the art will appreciate that with suitable modifications as discussed later in this specification, the valve operating mechanism of the present invention may also be used with the outlet valve of the drench gun.

In some embodiments of the present invention, the drench gun may be provided with two chambers.

In this embodiment of the invention, a first chamber may be formed by the interior of the dosage selector housing and a first side of the piston head.

A second chamber may be formed by a second side of the piston head and an outlet valve.

Although the various components defining the chamber may vary according to the particular type of drench gun, it should be understood that the piston head generally defines a sealed wall between the two chambers.

The fluid in the first chamber, which is supplied by the fluid reservoir, flows into the second chamber via a conduit and valve in the drench gun housing or via a conduit and valve in the piston head. Usually, the fluid exits the drench gun via the outlet valve at the far end of the second chamber.

In preferred embodiments of the present invention, the valve operating mechanism is operable by the handle of the drench gun.

In preferred embodiments of the invention, the handle of the drench gun is configured to have at least two ranges of movement.

This should be understood to mean that a partial squeeze of the handle may only cause a first range of movement, and a full squeeze of the handle will be required to cause the handle to go through the first range of movement and then a second (or more) range of movement.

Preferably, the first range of movement closes (or opens, depending on the requirements of the user) the inlet valve of the drench gun, and the second range of movement displaces the piston. In at least one of the ranges of movement, the pressure difference between the upstream side of the valve and the downstream side of the valve prevents the opening of the inlet valve.

However, a person skilled in the art will appreciate that this arrangement may be reversed such that the first range of movement displaces the piston, and the second range of movement closes (or opens, depending on the requirements of the user) the inlet valve.

Furthermore, persons skilled in the art will appreciate that with suitable modifications, the handle may only have a single range of movement, with another component providing a separate movement to operate the valve.

Preferably, the handle is a two part assembly, pivotally linked at one end of each part and axially linked. A first portion of the handle assembly is fixed relative to the dosage selector housing. A second portion of the handle is linked to the shaft of the piston, and is moveable relative to the first portion of the handle and dosage selector housing.

Preferably, the handle is biased by a spring, which forces the two parts of the handle apart. This spring shall now be referred to throughout the remainder of the specification as being the handle spring.

To move the piston, and thus displace any fluid in the chamber, the user must apply force to the handle to overcome the biasing force of the handle spring to bring the two parts of the actuator together.

The piston head, being linked to the moveable portion of the handle via the piston shaft, is moved through the barrel. As the head of the piston defines one wall of the chamber, and the other wall is fixed, the chamber becomes reduced in size. This forces the fluid in the chamber to exit via the outlet valve.

In this embodiment of the present invention, the valve operating mechanism is in the form of a valve clamp.

Preferably, the valve clamp is an elongate member arranged within the barrel of the applicator such that one end passes through a longitudinal passage formed in the head of the piston.

Preferably, the opposing end of the valve clamp is fixed to the outlet valve. However, persons skilled in the art will appreciate the opposing end of the clamp may be supported by another part of the barrel. For example, the nozzle end of the barrel may be configured with a dedicated support surface for the end of the valve clamp. However, for ease of manufacture, fixing the valve clamp to the outlet valve is preferred.

This elongate member shall be referred to as a stem throughout the remainder of this specification. It should be understood that the stem in this embodiment is relatively immobile with respect to the barrel. As the piston moves forward, the stem, arranged substantially in line with the piston, passes through the longitudinal passage in the piston head and shaft.

Preferably, the longitudinal passage is connected to the fluid supply, such that fluid enters the barrel via the passage.

In a conventional applicator, the inlet valve is usually positioned behind the head of the piston.

Persons skilled in the art will appreciate that situating the inlet valve in this position in this embodiment of the invention would not be practical, as the stem would pass through the space normally reserved for the inlet valve as the piston head moves forward. Thus in this embodiment, the inlet valve must be located further along the piston shaft, towards the fluid supply to the applicator.

Preferably, a bulb or similar construction at the end of the stem prevents the end of the stem from completely passing through the aperture of the piston head. The bulb will bias against the rear of the piston head, without passing through the piston head and into the barrel.

In some embodiments of the present invention, the bulb may be constructed from an elastomeric or similar material, which allows slight, but temporary deformation of the bulb.

This allows the bulb to better seal against the aperture of the piston head, as well as conferring a degree of flexibility to the valve clamp stem to compensate for minor differences in the size of the components which can happen during production.

In some embodiments, the stem may include a collar to limit movement of the valve clamp.

Preferably, the opposing end of the stem is fixed to the outlet valve. This may be achieved in a number of ways depending on the type of valve employed as the outlet valve.

For example, the outlet valve may be a flat, flexible disc constructed from an elastomeric material. Alternatively, the outlet valve may be an umbrella valve.

The terminus of the stem may be fixed to a collar or cup like construction, the perimeter of which contacts the periphery of the disc when the piston is retracted and thus clamping the outlet valve closed.

In this embodiment, the collar or cup may include a spring to bias the collar away from the periphery of the disc once the clamping force has been removed through displacement of the piston.

The advantage of using a flat disc or an umbrella valve as the outlet valve is that less pressure is required to bias open the outlet valve. This makes the present invention particularly useful when delivery of the fluid is required to be at a low pressure, and also reduces the amount of force which is necessary to applied by the user when delivering fluid.

Other solutions for securing the stem to the outlet valve would be readily apparent to persons skilled in the art.

In use, the piston head engages with the bulb of the stem, effectively pulling the valve clamp closed when the piston head is in a fully retracted position (at rest).

In some embodiments of the present invention, it may be the dosage selector or another component of the housing of the applicator which limits rearward travel of the piston.

However, in other embodiments of the present invention, the construction of the valve clamp stem is sufficiently robust, such that it is the bulb which limits the rearward travel of the piston.

As the valve clamp is fixed at the opposing end to the outlet valve, this pulls the outlet valve closed, by holding the outlet valve firmly against its seat. A pressure pulse cannot inadvertently bias the outlet valve open.

It is important to appreciate that in this embodiment of the invention, as the piston moves forward, the bulb of the stem is no longer engaged with the piston head, and thus fluid pressure is able to bias the outlet valve open as the piston moves forward.

However, persons skilled in the art will appreciate that variations of the present invention may be envisaged.

For example, in one envisaged embodiment, the stem may be fixed relative to the piston (in contrast to the embodiments described above). The stem has an enlarged end, such as a bulb or similar construction which engages with the downstream side of the outlet valve when the piston is in a retracted position.

This may entail the stem passing through the outlet valve. It will be appreciated by persons skilled in the art that this may mean that the stem will need to be sealed where it passes through the face of the outlet valve to prevent or minimise leakage of fluid in this area.

In this alternative embodiment, as the piston moves forward, the stem moves with the piston into the nozzle of the applicator. Because the bulb of the stem no longer engages with the outlet valve, the valve is able to bias open if sufficient fluid pressure is applied.

In some variants, the outlet valve may be displaced along with the stem, instead of the stem passing through the face of the outlet valve, but persons skilled in the art will appreciate that the nozzle of the barrel will need to be suitably configured to accommodate the displacement of the outlet valve.

The fixing of the stem relative to the piston may be particularly advantageous as this means that the inlet valve can be situated in a conventional manner, behind or integrated into the piston head.

Further variations to the basic valve clamp are envisaged by the applicants.

For example, in an alternative embodiment of the present invention, the valve clamp may be modified such that it acts as a secondary inlet valve.

Preferably, in this alternative embodiment, the passage in the piston shaft through which the stem (and fluid) passes is tapered towards the piston head. This should be understood to mean that the passage progressively narrows towards the downstream end of the piston.

Preferably in this alternative embodiment, the bulb of the valve clamp stem is configured to be complementary to the tapering of the longitudinal passage of the piston shaft.

In some embodiments of the present invention, the bulb may be provided with flanges or a skirt which is configured to engage with the terminus of the passage, thus more efficiently sealing the passage.

In some embodiments of the present invention, the inlet valve may be positioned in a conventional manner, in or adjacent to the head of the piston. In these embodiments, the stem of the valve clamp may pass through the inlet valve.

It will be appreciated by persons skilled in the art that this may mean that the stem will need to be sealed where it passes through the face of the inlet valve to prevent or minimise leakage of fluid in this area.

In normal operation, when displaced, the bulb and the tapered passage are so far apart that there is minimal impact upon fluid flow. However, as the piston head moves back to a position of rest, the bulb progressively closes the passage.

The tapering of the passage can help with a smooth transition in closing off the flow of fluid. Effectively, the piston is decelerated or dampened before reaching a position of rest.

This deceleration or damping may reduce or eliminate a pressure pulse that may otherwise form as a result of shutting off the fluid supply. In some embodiments, the pressure pulse may be prevented from passing the valve.

It should be appreciated that each of the embodiments described above may be adapted for use with twin chamber applicators with minimal effort.

In summary, it will be appreciated that the disclosed novel valve operating mechanisms have one or more of the following advantages:

- at least part of the operation of the valves is now independent of fluid pressure;
- reducing the potential for a pressure pulse passing the valve means that there is no wastage of fluid being delivered;
- less force is required to be applied to the actuator by the user in order to deliver the fluids, thus a lighter handle spring may be used so that less fatigue is experienced by the user;
- alternatively, a heavier handle spring may be used in situations where the reservoir is lower than the dispenser, the greater force of the spring able to overcome gravity acting upon the fluid being drawn from the reservoir;
- springs of a lighter weight may now be used in the inlet and/or outlet valves of the drench gun.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
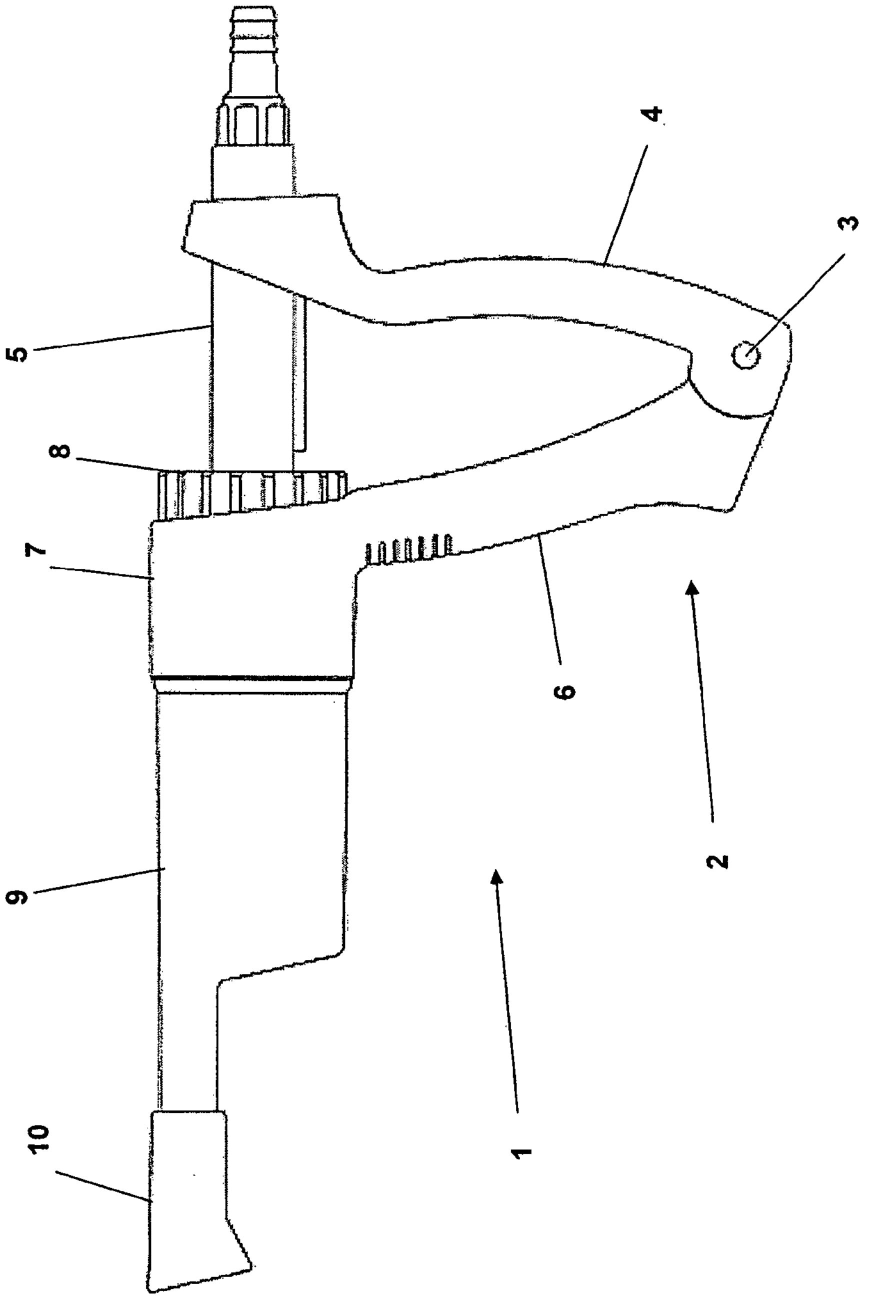
FIG. 1 is a side view of the exterior of a drench gun.

FIG. 1 illustrates a drench gun including the present invention.

The drench gun (generally indicated by arrow 1) includes a two part handle (2), hinged at its axis (3), with one portion (4) of the handle linked to the piston assembly (5).

The front portion (6) of the handle (2) forms part of the dosage selector housing moulding (7). At the rear of the housing (7) is the dosage selector (8), which can be manipulated by the user to determine the amount of fluid to be delivered.

To bias the handle (2), a spring (not shown) is used to provide resistance when the handle (2) is squeezed by the user.

The movement of the handle (2) causes the piston assembly (5), and thus the piston head (not shown) to move. This movement displaces the fluid (not shown) from the barrel (9) out the nozzle (10).

When the handle (2) is released, fluid flows into the barrel (9) via the inlet valve (not shown) as the piston head (not shown) returns to its rest position.

Figure 2:
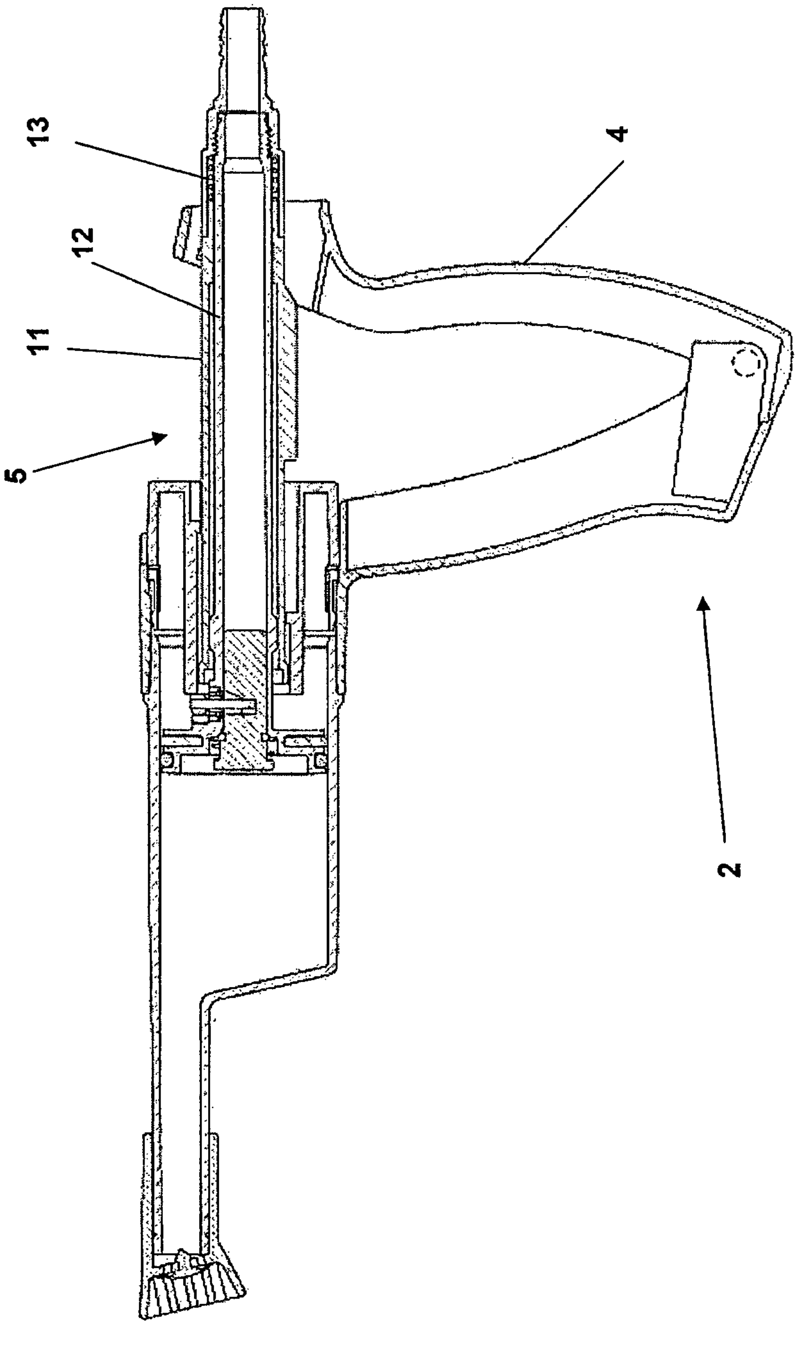
FIG. 2 is a side view of a first embodiment of the drench gun in cross-section.

Turning now to FIG. 2, in which the drench gun is shown in cross-section, it can be appreciated that the piston assembly (5) includes a sleeve (11) surrounding the piston shaft (12).

This sleeve is connected to the rear portion (4) of the handle (2). The sleeve (11) and piston shaft (12) are independently biased by a sleeve spring (13). This spring (13) biases the piston shaft (12) rearwards relative to the sleeve (11).

Figure 3:
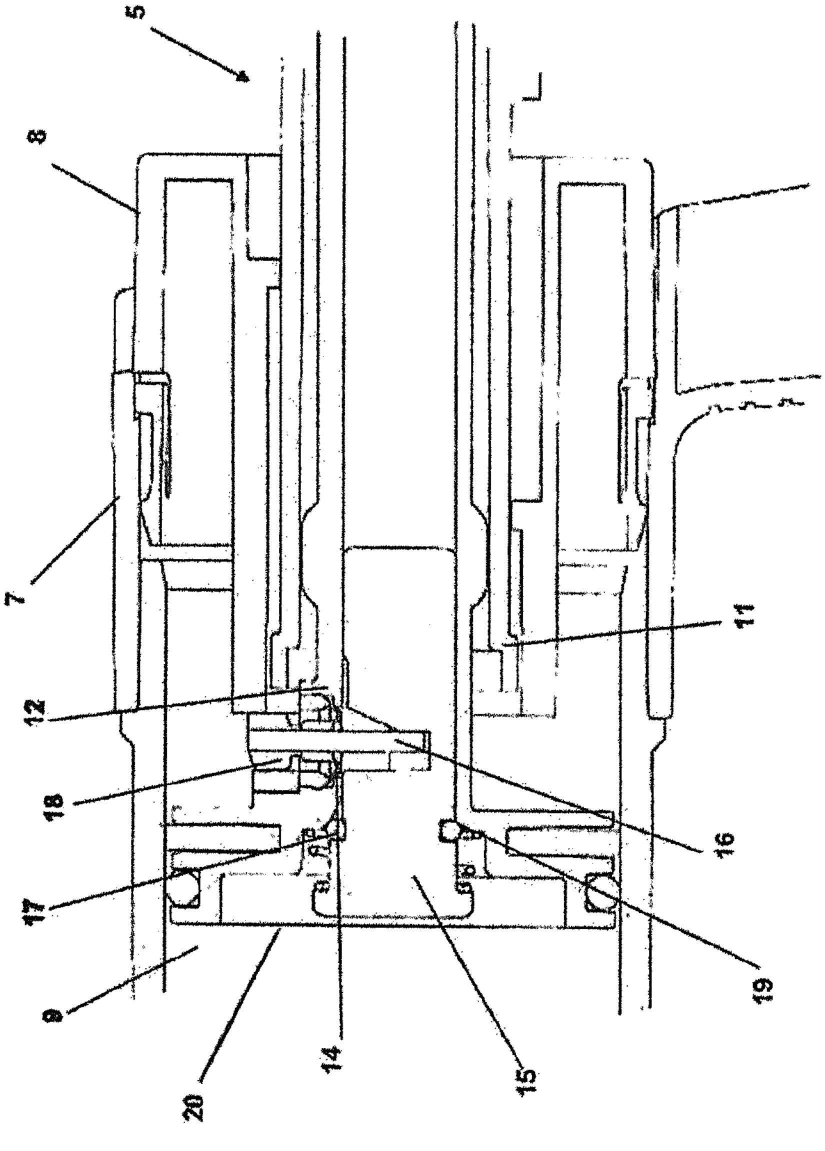
FIG. 3 is a detail side view of the first embodiment of the drench gun in cross-section when the sleeve is at rest and the piston is fully retracted.

In a detail view (FIG. 3) it will be appreciated that the piston assembly (5) also includes a pivot lever (18), mounted to the piston shaft (12) behind the piston head (20). The pivot lever (18), constructed from plastic, bears a pin (16) which holds the inlet valve (15) closed.

The inlet valve (15) has a cruciform cross-section (not shown) along most of its length, as is commonly used for such valves. Fluid is able to flow freely past the inlet valve (15) if the inlet valve (15) and its o-ring seal (17) move so that the seal (17) loses contact with the valve seat (19).

The pivot lever (18) is in contact with the dosage selector (8) of the drench gun when at rest. This keeps the inlet valve (15) and o-ring seal (17) held against the valve seat (19), preventing fluid from passing the inlet valve (15) into the barrel (9). Fluid pressure is unable to open the valve (15).

It should be appreciated that the sleeve (11) is not in contact with the pivot lever (18) when at rest.

Figure 4:
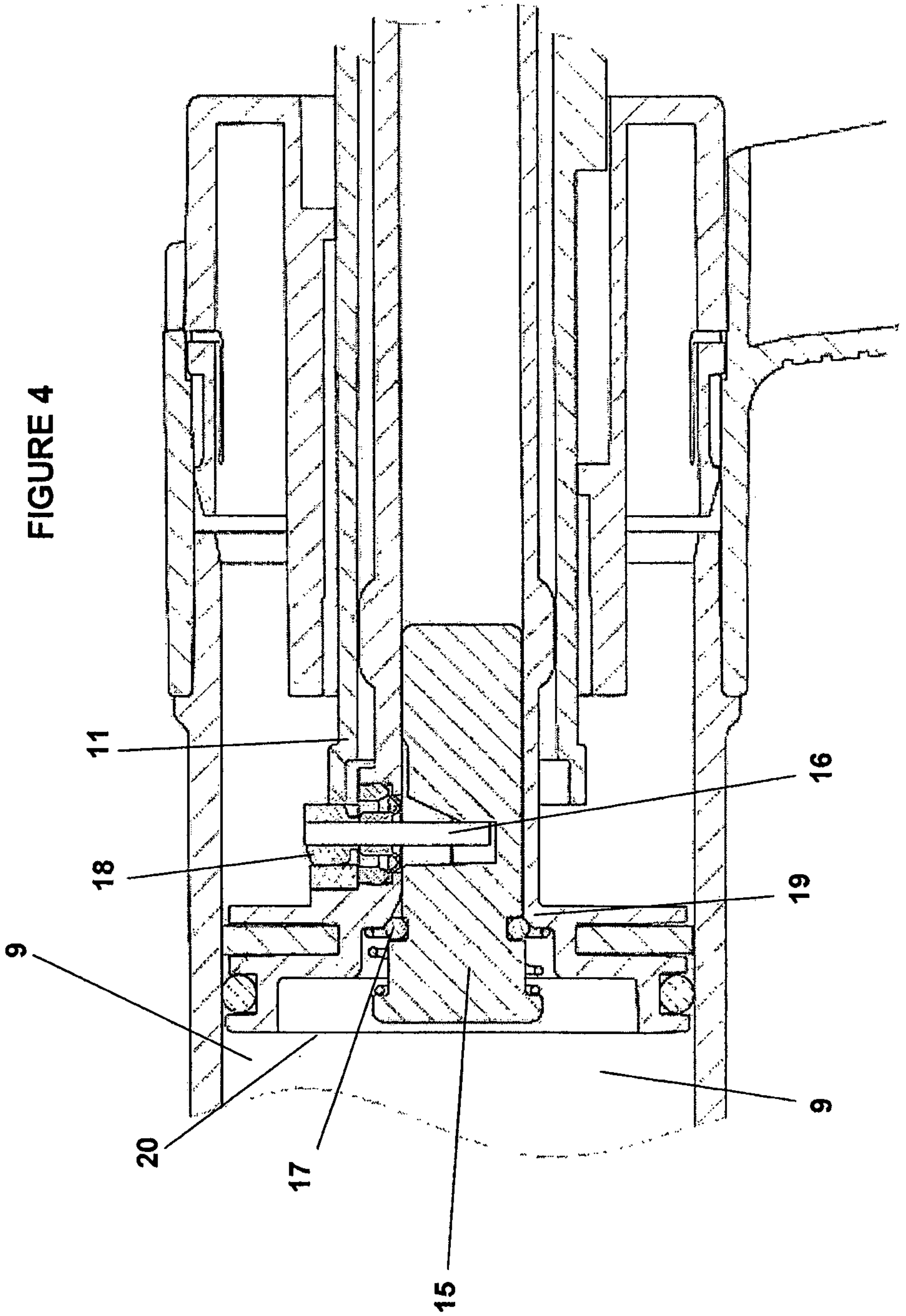
FIG. 4 is a detail side view of the first embodiment of the drench gun in cross-section when the sleeve and piston is displaced from a rest position.

However, when the sleeve (11) is displaced by actuation of the handle (not shown), it biases against the pivot lever (18), as illustrated in FIG. 4. This maintains the inlet valve (15) in a closed position, which still prevents fluid pressure from opening the inlet valve (15).

Because of the sleeve (11) bearing against the pivot lever (18) and hence acting on the pin (16), the inlet valve (15) remains closed even as the piston head (20) moves through the barrel (9), discharging any fluid out of the nozzle (not shown) of the drench gun.

Figure 5:
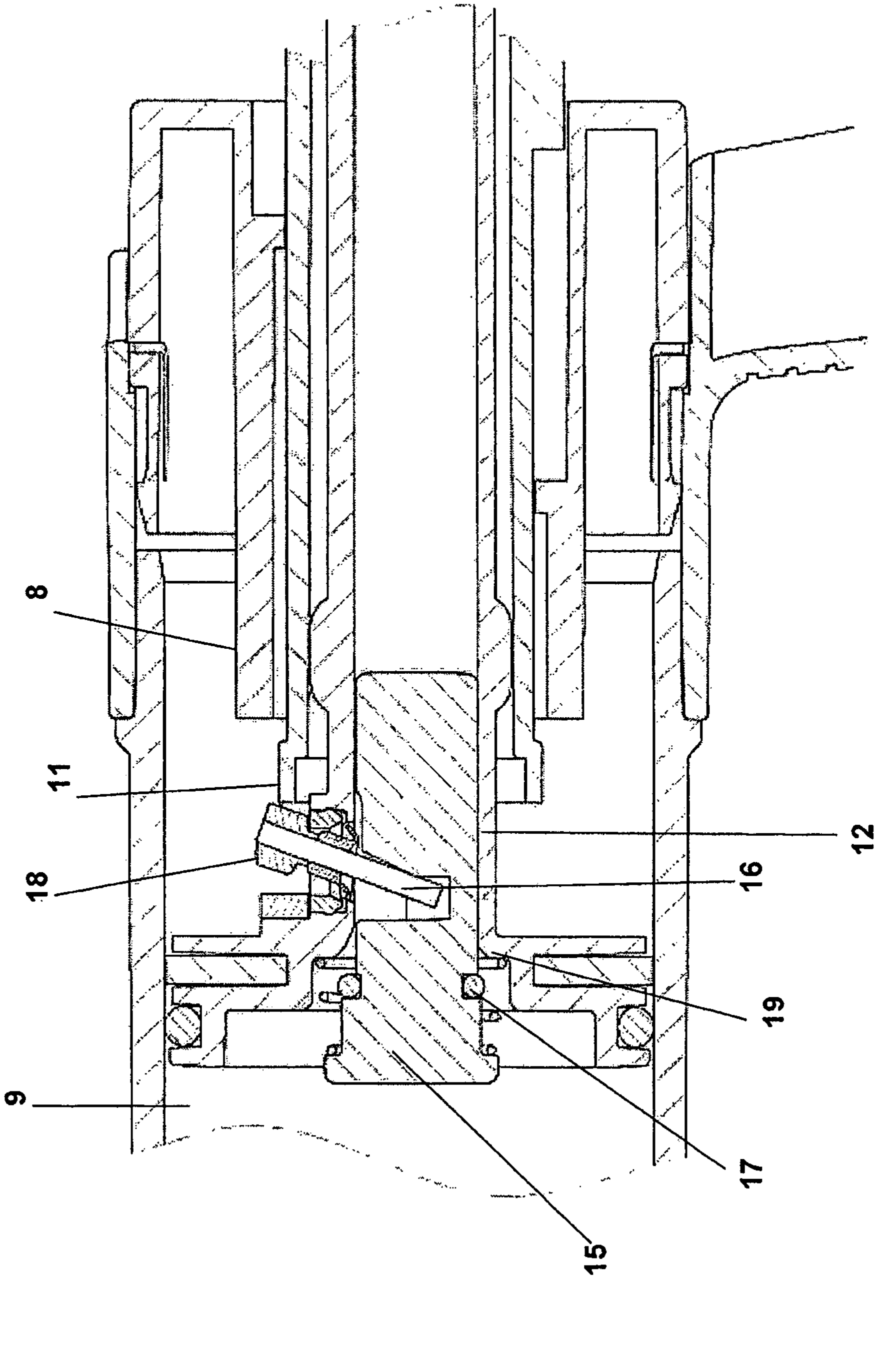
FIG. 5 is a detail side view of the first embodiment of the drench gun in cross-section when the sleeve and piston are returning from their maximum displacement.

However, when the piston shaft (12) reaches the end of its travel and returns from its maximum displacement as illustrated in FIG. 5, the sleeve (11) retreats away from the pivot lever (18) and ceases to act on the pin (16).

This releases the inlet valve (15) from the valve seat (19), permitting fluid (not shown) to pass through the inlet valve (15) from the fluid supply (not shown) through the difference in fluid pressure between the upstream and downstream sides of the valve (15). The fluid (not shown) flows into the barrel (9) to recharge the drench gun.

The inlet valve (15) will stay open until the pivot lever (18) contacts the dosage selector (8). This contact with the dosage selector (8) will bias the pin (16) back to its rest position, closing the inlet valve (15). This locking action prevents the inlet valve (15) from inadvertently opening due to the increase in fluid pressure from any pressure pulse caused when there is a sudden stoppage in the fluid supply as the valve (15) is closed.

Figure 6:
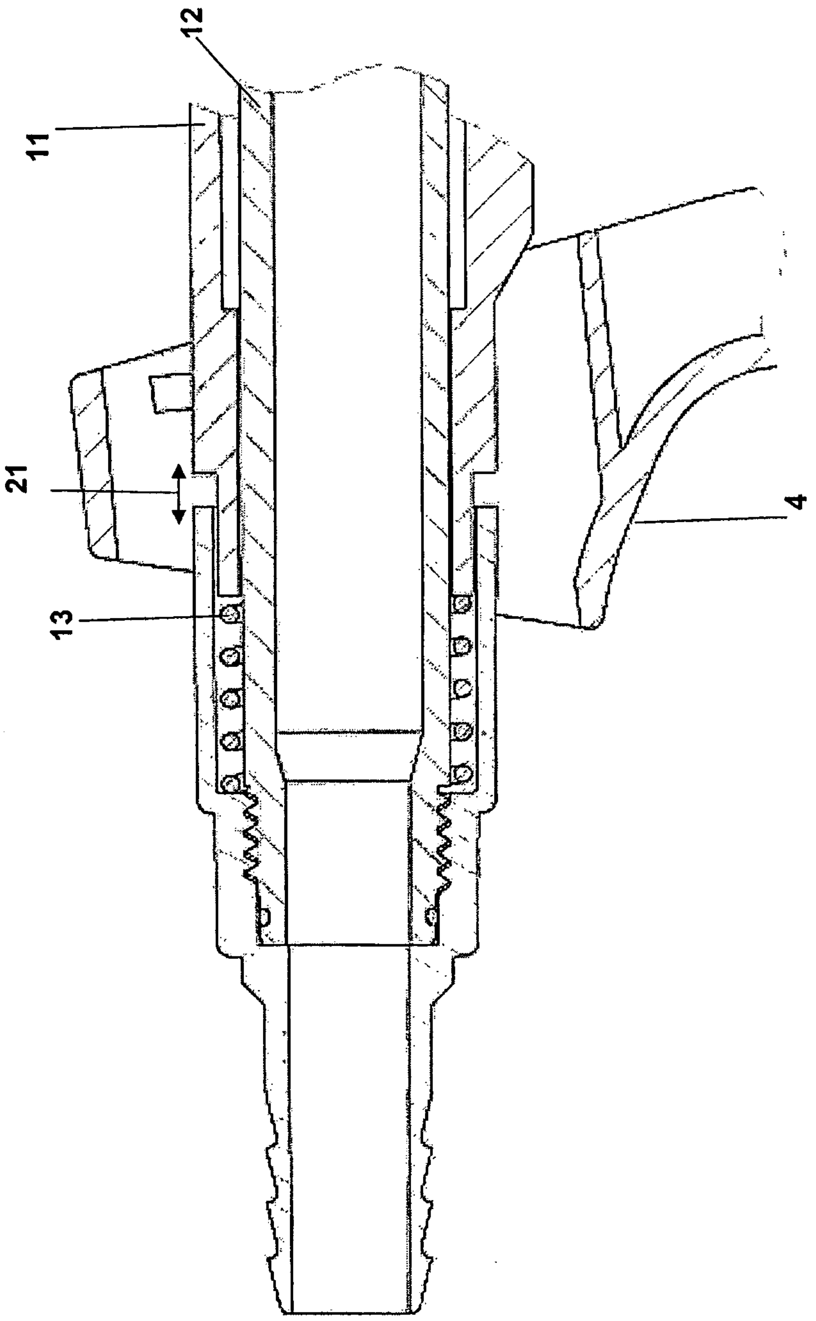
FIG. 6 is a detail side view of the sleeve and piston shaft of the first embodiment of the drench gun when the sleeve is displaced.
Figure 7:
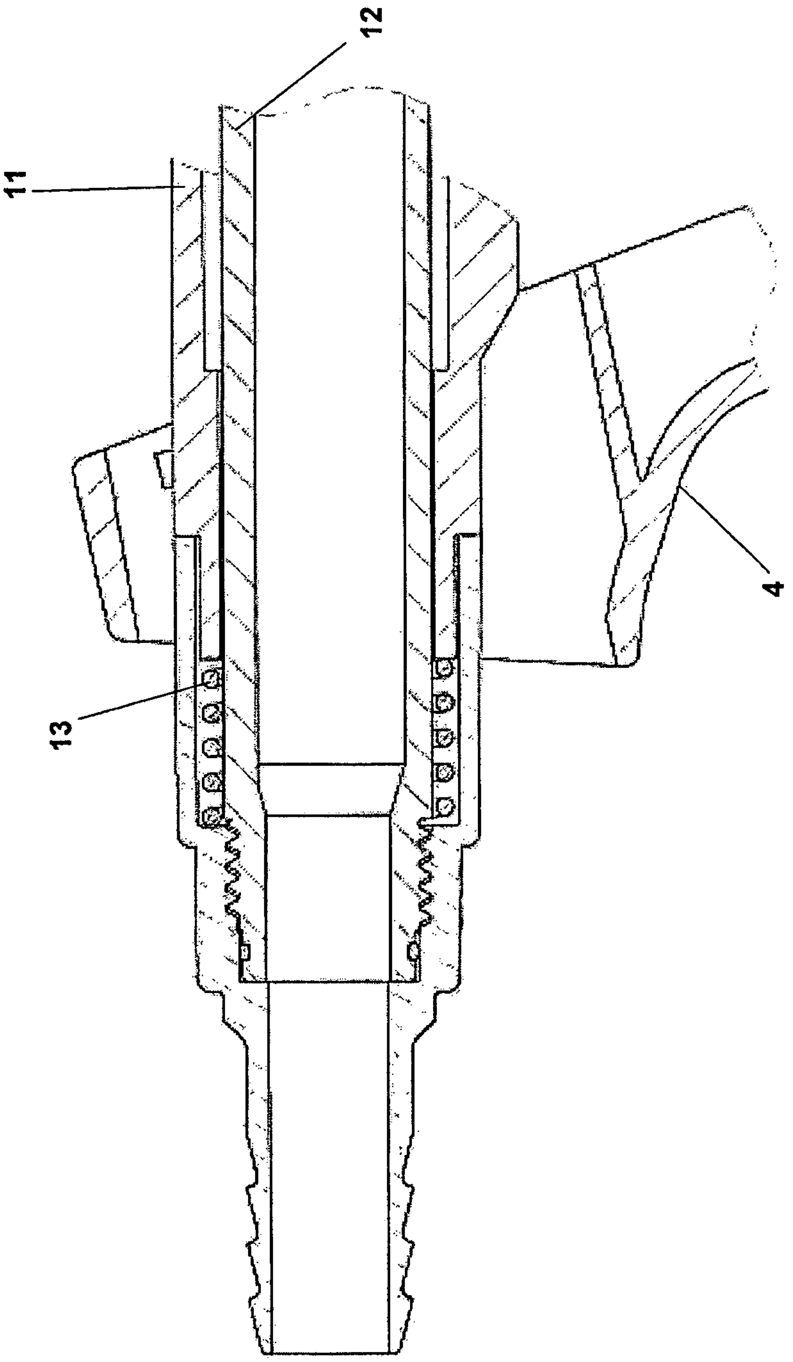
FIG. 7 is a detail side view of the sleeve and piston shaft of the first embodiment of the drench gun when the sleeve is at rest.

It should be appreciated from reviewing FIGS. 6 and 7 that the sleeve (11) has a small degree of independent movement from the piston shaft (12). This range of movement is indicated by arrow 21 in FIG. 6. When at rest with the piston fully retracted, the bias of the sleeve spring (13) is overcome by the stronger bias of the handle spring (not shown), and the relative positions are as shown in FIG. 7.

When the rear portion (4) of the handle (not shown) is actuated, this urges the sleeve (11) forward relative to the piston shaft (12), compressing the sleeve spring (13).

The sleeve (11), once it reaches the pivot lever (18), causes displacement of the piston shaft (12), and thus moves the piston head (not shown) through the barrel (not shown) of the drench gun.

Figure 8:
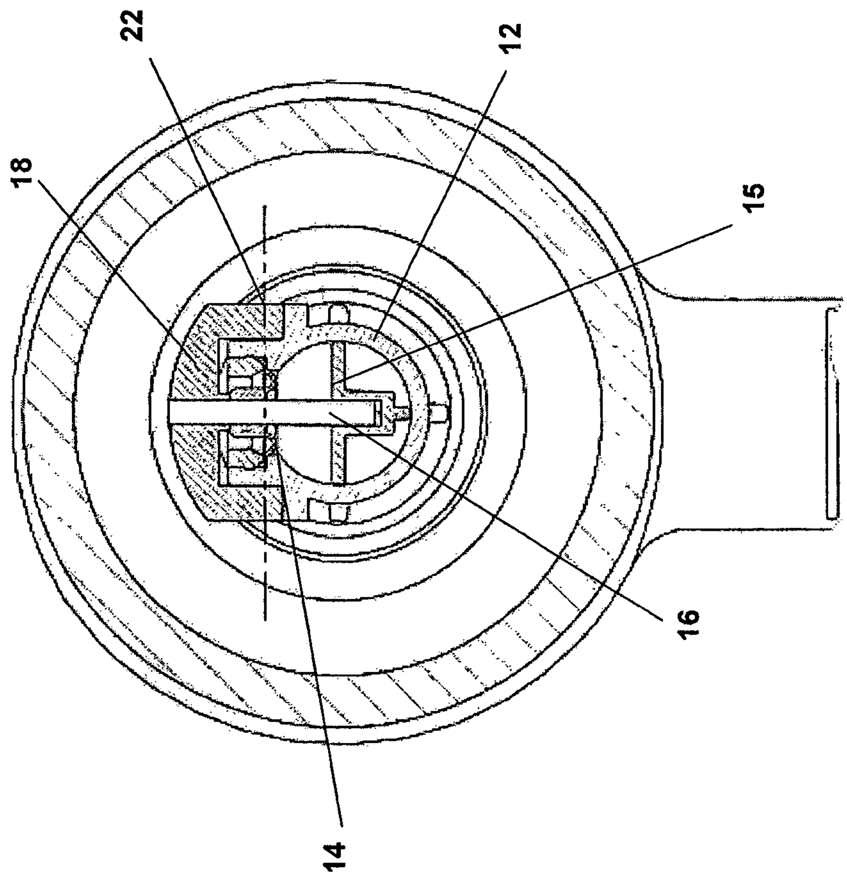
FIG. 8 is a front view of the first embodiment of the drench gun in cross-section.

The pivot lever (18), illustrated in cross-section in FIG. 8, is secured to the piston shaft (12) via a pivot (22) on each side of the piston shaft (12).

The pivot lever also includes a diaphragm (14), sealing the pin (16), but at the same time allowing movement of the pin (16).

Figure 9:
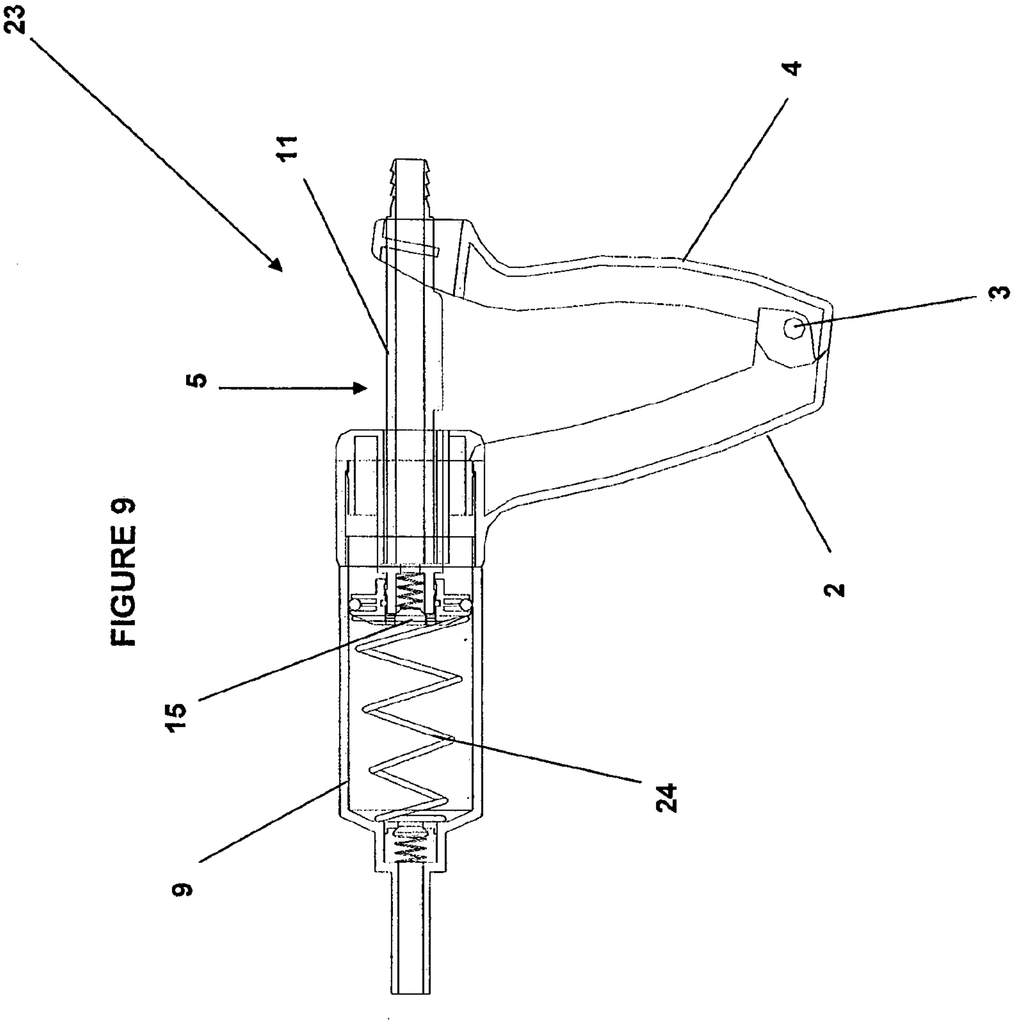
FIG. 9 is a side view of a variant of the first embodiment of the drench gun in cross-section.

An alternative embodiment (23) of the present invention is depicted in FIG. 9. This embodiment shares a number of features with the previous embodiment described, including a two part handle (2, 4) hinged at its axis (3). There is also a piston assembly (5) which includes a sleeve (11).

A key difference from previous embodiments illustrated is the re-arrangement of the spring (24). Instead of being in the handle (2, 4), the spring (24) is now situated inside the barrel (9).

Otherwise, the principle of operation of this embodiment (23) of the invention remains the same. The sleeve (11) moves through a first range of movement, leaving the piston assembly (5) to continue through the second range of movement. As the piston assembly (5) retreats, the inlet valve (15) is open to allow refilling of the barrel (9).

Figure 10:
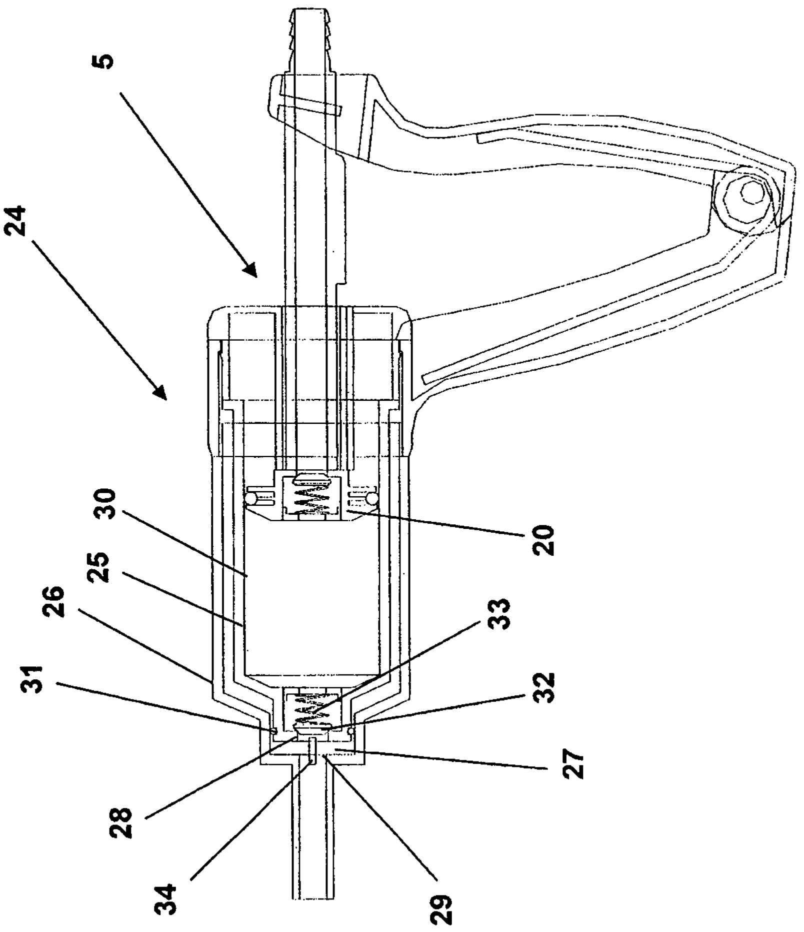
FIG. 10 is a side view of a second embodiment of the drench gun in cross-section.

Turning now to FIG. 10, a second embodiment of the invention is described.

In this view, it can be appreciated that the applicator (24) has an inner barrel (25) and an outer barrel (26), the inner barrel (25) being moveable longitudinally relative to the outer barrel (26). The extent of travel of the inner barrel (25) is limited by the space (27) between the outlet (28) of the inner barrel (25) and the outlet (29) of the outer barrel (26).

The inner barrel (25) moves as a result of an increase in fluid pressure as the piston assembly (5) is actuated, and the friction of the piston head (20) against the interior surface (30) of the inner barrel (25).

Between the two barrels is provided a seal (31), which prevents fluid (not shown) getting into the space (27) between the inner (25) and outer barrels (26).

An outlet valve (32), which is biased by a spring (33), is situated at the outlet end (28) of the inner barrel (25). The outer barrel (26) is provided with a pin (34) proximate to the outlet valve (32).

As the inner barrel (25) moves forward relative to the outer barrel (26), the face of the outlet valve (32) biases against the pin (34) of the outer barrel (26). This causes the outlet valve (32) to bias open, permitting passage of fluid (not shown).

When the piston assembly (5) is retracted (as depicted), it is not possible for the outlet valve (32) to bias open from the direction of the fluid supply (not shown). Thus, if a pressure pulse occurs, it is unable to cause leakage of fluid (not shown).

Figure 11:
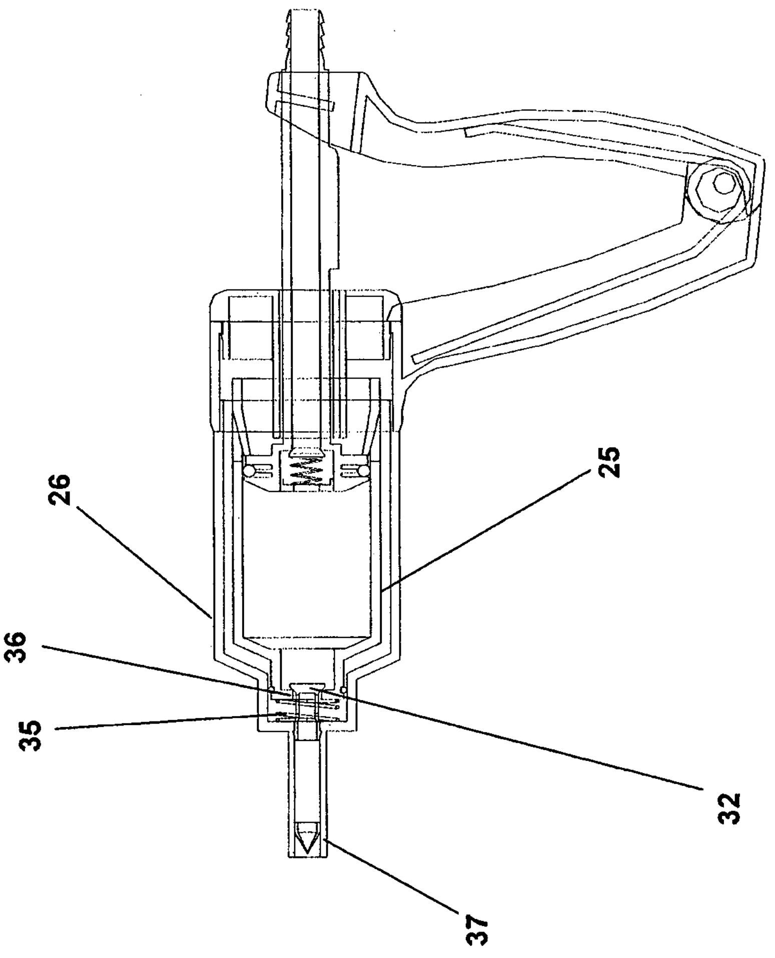
FIG. 11 is a side view of a variant of the second embodiment of the drench gun in cross-section.

FIG. 11 presents a variant of the second embodiment of the invention illustrated in the previous figure. In this embodiment, the outlet valve (32) is fixed relative to the outer barrel (26). A spring (35) is provided between the two barrels (25, 26) to bias against movement of the inner barrel.

Thus, as the inner barrel (25) moves forward relative to the outer barrel (26) with sufficient force to overcome the biasing force of the spring (35), the outlet valve (32) is no longer able to engage with the opening (36) in the inner barrel (25). This permits fluid (not shown) to pass through the inner barrel (25) and out the nozzle (37).

When fluid pressure decreases sufficiently that the biasing force of the spring (35) exceeds the fluid pressure, the valve (32) will close.

Figure 12:
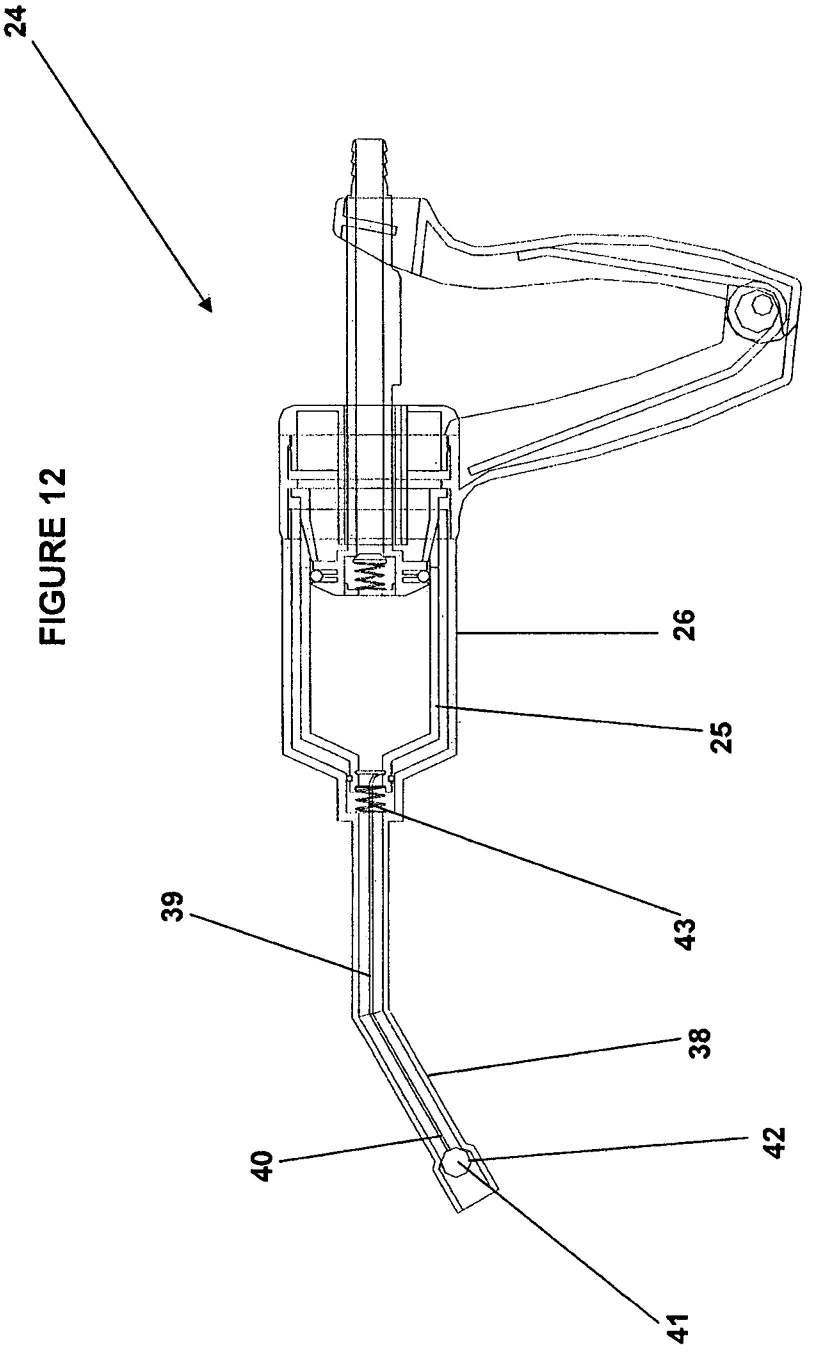
FIG. 12 is a side view of a second variant of the second embodiment of the drench gun in cross-section.

A similar variant is depicted in FIG. 12. In this embodiment, the applicator (24) is provided with an elongate nozzle (38). This elongated nozzle (38) can be useful when applying fluid to difficult to reach surfaces.

In this embodiment of the invention, the inner barrel (25) is provided with a relatively rigid wire (39) extending into the nozzle (38) of the applicator (24).

At the terminus (40) of the wire, a ball valve (41) or similar is provided, blocking the outlet (42) of the nozzle (38). The inner barrel (25) is tensioned via a spring positioned (43) between the inner (25) and outer barrels (26).

Displacement of the inner barrel (25) relative to the outer barrel (26) will cause movement of the wire (39). This moves the ball valve (41) away from the outlet (42) of the nozzle (38) to permit passage of fluid (not shown) through the nozzle (38).

As with the previous embodiments illustrated in FIGS. 10 and 11, the outlet valve (41) cannot be biased open without the displacement of the inner barrel (25). This helps ensure that inadvertent fluid pressure, such as a pressure pulse, cannot bias the outlet valve (41) open.

Figure 13:
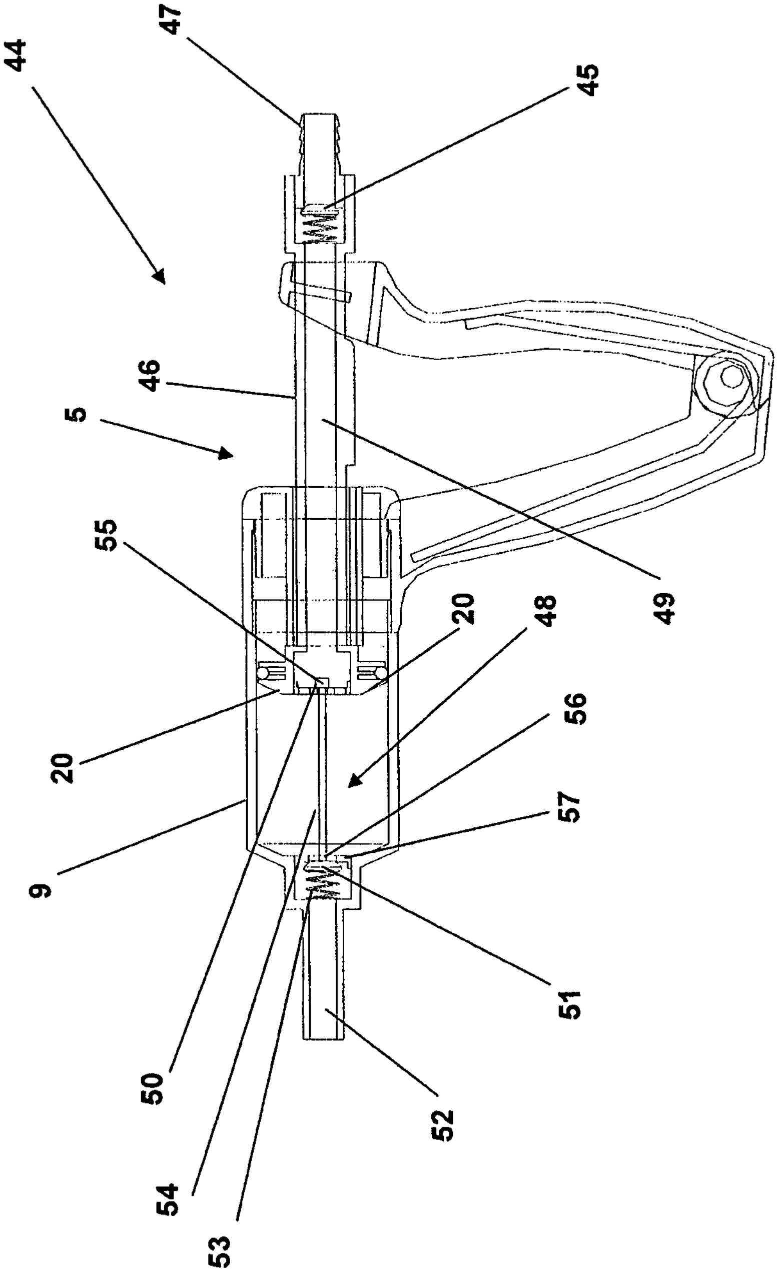
FIG. 13 is a side view of a third embodiment of the drench gun in cross-section.

Turning now to FIG. 13, it will be appreciated that this embodiment of the applicator (44) differs from those previously described due to the placement of the inlet valve (45).

The inlet valve (45) is positioned in the piston shaft (46) at the spigot end (47) of the applicator (44). This is to make room in the piston head (20) for a valve clamp (48).

The piston shaft (46) itself includes a channel or pathway (49) for fluid (not shown) from the fluid supply (not shown) to the piston head (20), the fluid (not shown) passing through an aperture (50) in the piston head (20) and into the barrel (9).

The outlet valve (51) is positioned in a conventional manner, in or adjacent to the nozzle (52) of the applicator (44). The outlet valve (51) is provided with a spring (53) which provides some biasing force to the outlet valve (51). The outlet valve (51) also includes a valve clamp (48).

The valve clamp (48) is formed from an elongate stem (54), which is fixed relative to the barrel (9) of the applicator (44). The stem (54) is configured to pass through the aperture (50) in the piston head (20). At the terminus of the stem (54), a bulb like protrusion (55) is provided. This is to ensure that the stem (54) of the valve clamp (48) cannot fully disengage from the piston shaft (46).

The opposing end (56) of the stem (54) is fixed to the outlet valve (51). When the bulb (55) of the stem (54) engages with the reverse side of the aperture (50) to seal it from the barrel (9), as when occurs when the piston assembly (5) is at rest as depicted in FIG. 13, this holds the outlet valve (51) against its sealing surface (57).

This arrangement prevents a pressure pulse, or the pressure of an elevated fluid supply, from inadvertently biasing open the outlet valve (51).

Upon actuation of the piston assembly (5), the bulb (55) of the valve clamp (48) no longer engages with the reverse side of the aperture (50) in the piston head (20).

The only force keeping the outlet valve (51) closed is that of the spring (53) of the outlet valve (51). The spring (53) is overcome by the increase in pressure as the piston head (20) moves forward, allowing fluid (not shown) to exit the barrel (9).

When the piston head (20) begins to retreat, the spring (53) biases the outlet valve (51) closed, although it is not locked closed until the bulb (55) of the valve clamp (48) engages with the reverse side of the aperture (50) in the piston head (20).

Figure 14:
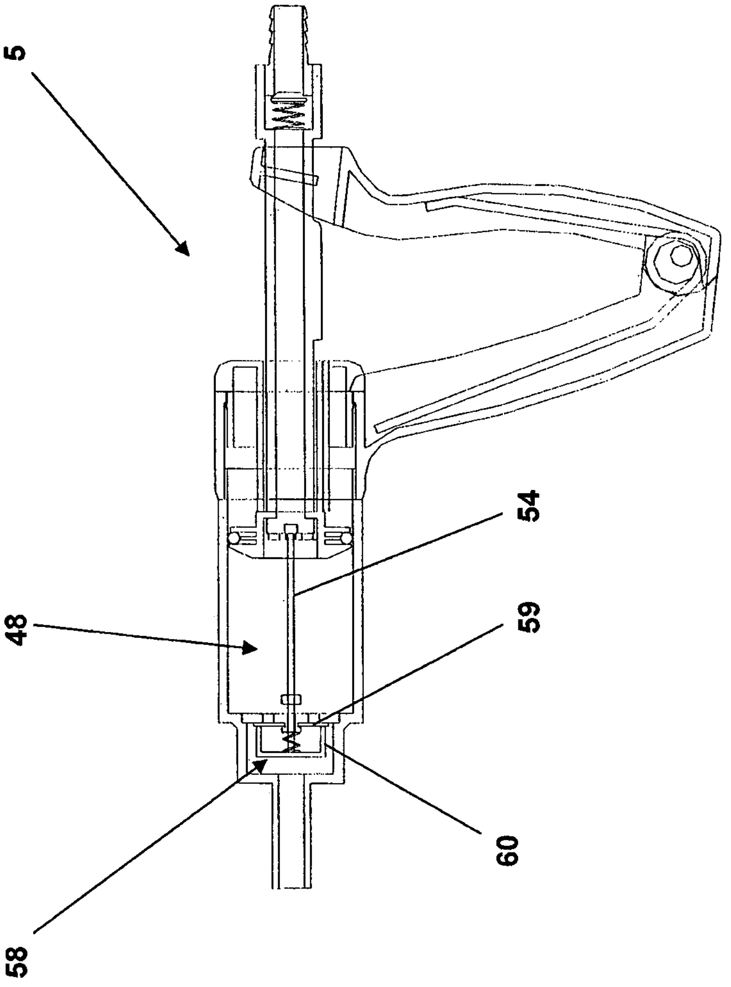
FIG. 14 is a side view of a variant of the third embodiment of the drench gun in cross-section.
Figure 15:
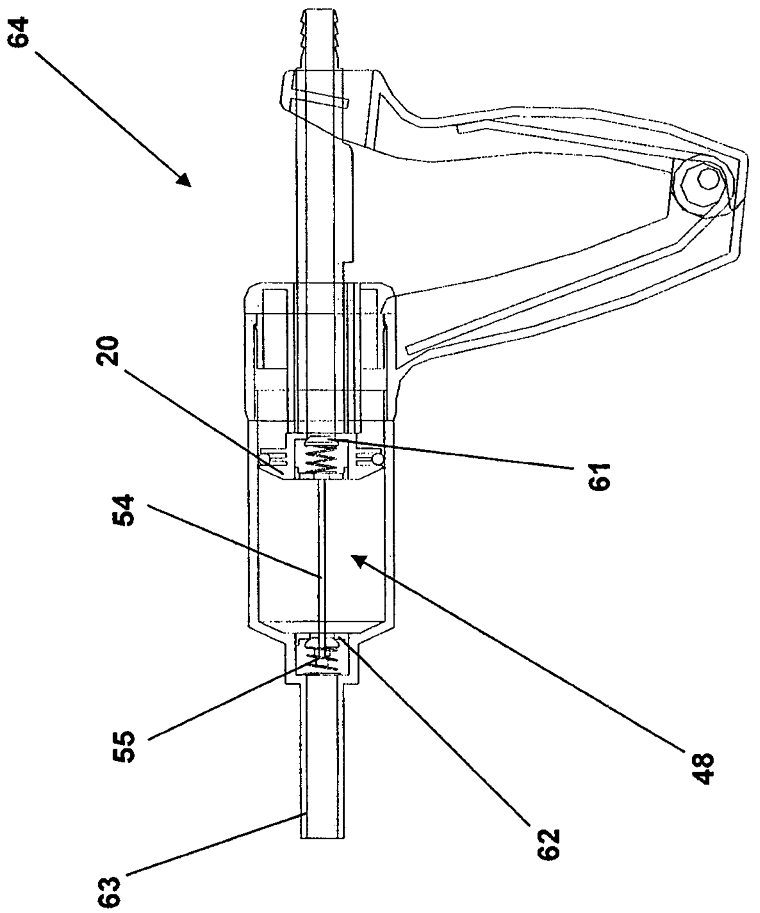
FIG. 15 is a side view of a second variant of the third embodiment of the drench gun in cross-section.

Variations of the embodiment discussed in relation to FIG. 13 are illustrated in FIGS. 14 and 15.

In FIG. 14, the outlet valve (58) differs from that previously described in that the outlet valve (58) includes a flexible disc (59). Positioned over the disc (59) is a cup (60), the perimeter of which engages with the perimeter of the disc (59). The stem (54) of the valve clamp (48) passes through the disc (59), and is secured to the cup (60).

This arrangement, while working in the same manner as the embodiment of FIG. 13, is particularly advantageous as the pressure required to open the outlet valve (58) is considerably less than that of the previous embodiment. This makes it ideal for low pressure applications, where a gentler fluid stream is caused by actuation of the piston assembly (5).

In FIG. 15, the inlet valve (61) is restored to its conventional location in the piston head (20). However, in this embodiment, the stem (54) of the valve clamp (48) is fixed relative to the inlet valve (61).

The stem (54) passes through the outlet valve (62), and the bulb (55) of the stem (54) engages with the reverse side (the downstream side) of the outlet valve (62).

Thus it will be appreciated that the actuation of the piston head (20) will move the stem (54), being fixed to the inlet valve (61), through the outlet valve (62) into the nozzle (63) of the applicator (64). This has the advantage of restoring the inlet valve (61) to its conventional location, in contrast to the embodiments depicted in FIGS. 13 and 14.

Figure 16:
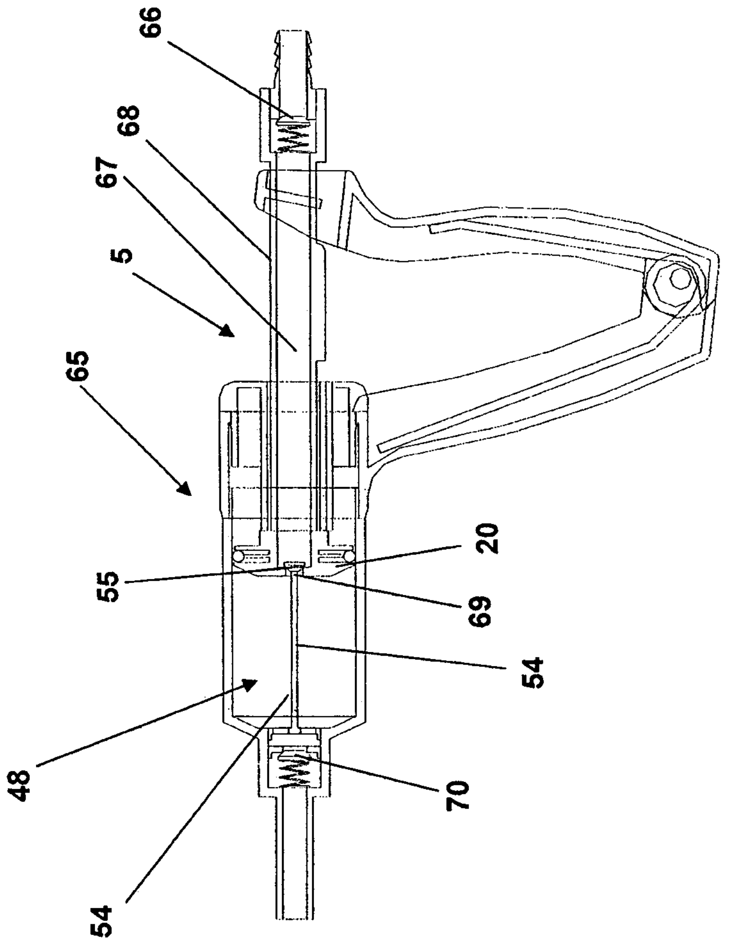
FIG. 16 is a side view of a third variant of the third embodiment of the drench gun in cross-section.
Figure 17:
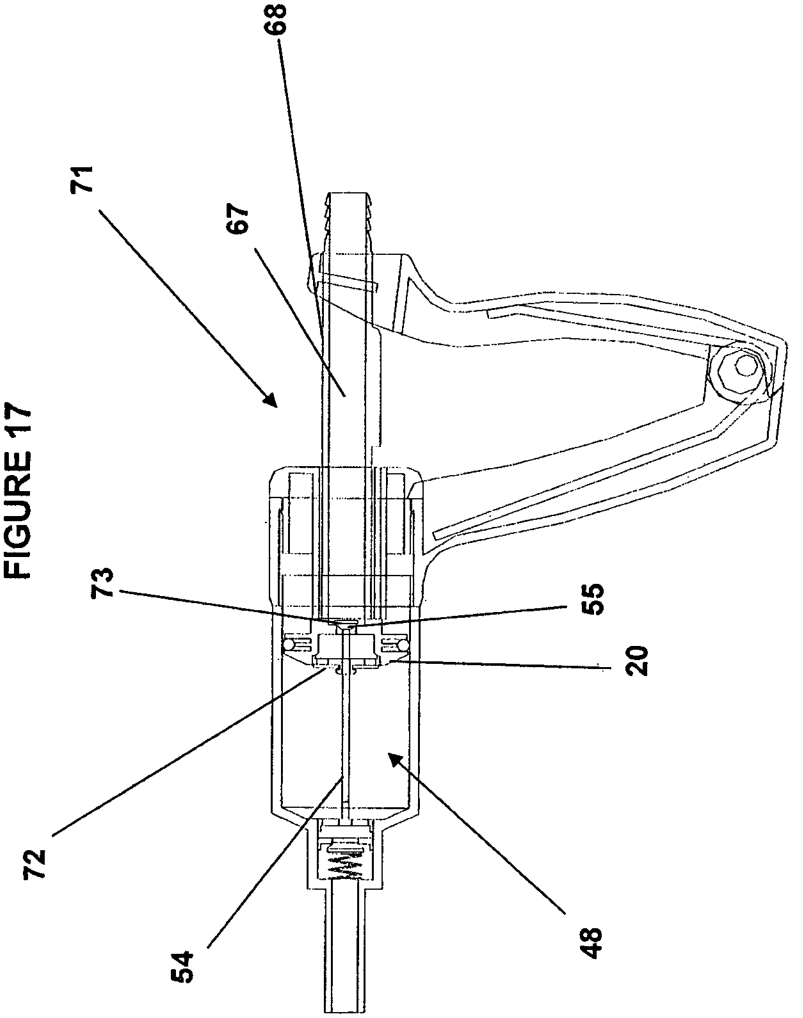
FIG. 17 is a side view of a fourth variant of the third embodiment of the drench gun in cross-section.

Persons skilled in the art will appreciate that the valve clamp (48) can be further modified to function as a secondary inlet valve, as illustrated in FIGS. 16 and 17.

In FIG. 16, the basic features of the applicator (65) are identical to those depicted in FIGS. 13 and 14, with the inlet valve (66) positioned to the rear of the applicator (65).

The key difference in the embodiment illustrated in FIG. 16 is that the passage (67) of the piston shaft (68) through which the stem (54) passes is progressively tapered as it reaches the piston head (20). The bulb (55) of the stem (54) of the valve clamp (48) is configured with a complementary tapering.

Thus, as the bulb (55) passes through the passage (67) when the piston assembly (5) is being returned to its rest position, the aperture (69) of the passage (67) through which the fluid (not shown) passes through the piston head (20) progressively becomes more and more constricted until it finally closes.

The progressive tapering of the passage of the piston shaft (67), and the corresponding taper of the bulb (55) of the valve clamp (48) reduces the potential for a pressure pulse to occur as the fluid supply (not shown) is shut off. This effectively decelerates the piston assembly (5). However, the tapering does not impede the fluid flow when the bulb (55) and aperture (69) of the piston head (20) are well apart.

Effectively, the bulb (55) acts as a secondary inlet valve when engaged with the aperture (69) of the piston head (20).

However, depending on the configuration of the tapering, the secondary inlet valve may not act as an effective seal, this function being fulfilled by the inlet (66) and outlet valves (70). To ensure an effective sealing of the secondary inlet valve, the bulb (55) of the stem (54) of the valve clamp (48) may include a flange or the like (not shown) which engages with the aperture (69) of the piston head (20) to act as a seal.

In FIG. 17, illustrating yet another variant of an applicator (71) utilising the valve clamp (48), the applicator (71) is substantially that described with reference to FIG. 15, in which the inlet valve (72) is positioned conventionally in the piston head (20).

However, in this embodiment, the inlet valve (72) may be in the form of a flexible disc, which is more easily biased open by fluid pressure. Thus it will be appreciated that a secondary inlet valve which is unable or substantially unable to be acted upon by fluid pressure is particularly advantageous, as it preserves the ability of the applicator (71) to be used in situations where a low pressure fluid delivery is required.

The stem (54) of the valve clamp (48) passes through the inlet valve (72). However, the bulb (55) as with the embodiment described in FIG. 16, the bulb (55) is tapered, along with the portion (73) of the passage (67) of the piston shaft (68) with which it engages.

This provides a progressive restriction in fluid passing through the passage way (73) as the bulb (55) and the piston head (20) come together which minimises or prevents a pressure pulse forming as a result of shutting off of the fluid supply (not shown) to the applicator (71).

Aspects of the present invention have been described by way of example only and it should be appreciated that modifications and additions may be made thereto without departing from the scope thereof as defined in the appended claims.

What we claim is:

1. A valve operating mechanism for use in a fluid dispenser, wherein the fluid dispenser includes:
a reservoir for a fluid to be delivered, and
an fluid outlet for the reservoir, and
a piston configured to move through the reservoir, wherein the piston includes a
piston head and piston shaft, and
an actuator for the piston,
the valve operating mechanism comprising:
a valve, wherein the valve has an upstream side and a downstream side; and
the valve operating mechanism including a piston sleeve for the piston shaft,
wherein the piston sleeve is linked to the actuator such that it is slidably movable relative to the piston shaft,
wherein the actuator is configured to have at least two ranges of movement,
wherein the first range of movement closes the valve and the second range of movement displaces the piston such that in at least one point of operation of the valve operating mechanism, the valve is inoperable as a consequence of the pressure difference between the upstream side of the valve and the downstream side of the valve.

2. The valve operating mechanism as claimed in claim 1 wherein one end of the piston sleeve is biased by a spring.

3. The valve operating mechanism as claimed in claim 1 wherein a portion of the sleeve proximate to the piston head is configured to engage with a biasing means for the valve.

4. The valve operating mechanism as claimed in claim 3 wherein the sleeve activates the biasing means for the valve when the actuator passes through the first range of movement.

5. The valve operating mechanism as claimed in claim 3 wherein the biasing means for the valve is pivotally mounted to the shaft of the piston, behind the piston head.

6. The valve operating mechanism as claimed in claim 3 wherein the biasing means is a pivot lever mounted to the piston shaft via pivot points on a portion of the piston shaft.

7. The valve operating mechanism as claimed in claim 6 wherein the pivot lever includes a pin extending perpendicular to the piston shaft.

8. The valve operating mechanism as claimed in claim 6 wherein a portion of the fluid dispenser is configured to engage with the pivot lever.

9. The valve operating mechanism as claimed in claim 8 wherein a first end of the pivot lever is configured to engage with the fluid dispenser when the sleeve is passing through a first range of movement and is engaged with the sleeve when the sleeve is passing through a second range of movement.

10. The valve operating mechanism as claimed in claim 9 wherein the pivot lever is configured to bias against the valve when the sleeve contacts the pivot lever.

11. The valve operating mechanism as claimed in claim 1 wherein the piston is biased by a spring.

12. The valve operating mechanism as claimed in claim 1 wherein the actuator is biased by a spring.

13. The valve operating mechanism as claimed in claim 1 wherein the actuator is a handle for the fluid dispenser.

14. The valve operating mechanism as claimed in claim 1 wherein the fluid dispenser is a drench gun.

15. A fluid dispenser, comprising:
a reservoir for a fluid to be delivered;
a fluid outlet for the reservoir;
a piston configured to move through the reservoir;
an actuator for the piston, wherein the piston includes a piston head and piston shaft;
a valve operating mechanism, including a valve, wherein the valve has an upstream side and a downstream side, the valve operating mechanism including a piston sleeve for the piston shaft, the piston sleeve is linked to the actuator such that it is slidably moveable relative to the piston shaft, the actuator is configured to have at least two ranges of movement, the first range of movement closes the valve and the second range of movement displaces the piston such that in at least one point of operation of the valve operating mechanism, the valve is inoperable as a consequence of the pressure difference between the upstream side of the valve and the downstream side of the valve.

16. The fluid dispenser as claimed in claim 15 wherein one end of the piston sleeve is biased by a spring.

17. The fluid dispenser as claimed in claim 15 wherein a portion of the sleeve proximate to the piston head is configured to engage with a biasing means for the valve.

18. The fluid dispenser as claimed in claim 17 wherein the sleeve activates the biasing means for the valve when the actuator passes through the first range of movement.

19. The fluid dispenser as claimed in claim 17 wherein the biasing means for the valve is pivotally mounted to the shaft of the piston, behind the piston head.

20. The fluid dispenser as claimed in claim 17 wherein the biasing means is a pivot lever mounted to the piston shaft via pivot points on a portion of the piston shaft.

21. The fluid dispenser as claimed in claim 20 wherein the pivot lever includes a pin extending perpendicular to the piston shaft.

22. The fluid dispenser as claimed in claim 20 wherein a portion of the fluid dispenser is configured to engage with the pivot lever.

23. The fluid dispenser as claimed in claim 22 wherein a first end of the pivot lever is configured to engage with the fluid dispenser when the sleeve is passing through a first range of movement and is engaged with the sleeve when the sleeve is passing through a second range of movement.

24. The fluid dispenser as claimed in claim 23 wherein the pivot lever is configured to bias against the valve when the sleeve contacts the pivot lever.

25. The fluid dispenser as claimed in claim 15 wherein the piston is biased by a spring.

26. The fluid dispenser as claimed in claim 15 wherein the actuator is biased by a spring.

27. The fluid dispenser as claimed in claim 15 wherein the fluid dispenser is a drench gun.

28. A method of operating a valve operating mechanism as claimed in claim 1, characterised by the steps of:

a) filling the reservoir with a fluid, and b) actuating the piston such that the piston moves through the reservoir to force the fluid out of the fluid outlet, wherein in at least one point of operation of the valve operating mechanism, the valve is inoperable as a consequence of the pressure difference between the upstream side of the valve and the downstream side of the valve.

29. A method of operating a fluid dispenser as claimed in claim 15, characterised by the steps of:

b) filling the reservoir with a fluid, and b) actuating the piston such that the piston moves through the reservoir to force the fluid out of the fluid outlet, wherein in at least one point of operation of the valve operating mechanism, the valve is inoperable as a consequence of the pressure difference between the upstream side of the valve and the downstream side of the valve.

30. The method of operating a fluid dispenser as claimed in claim 29 wherein the fluid dispenser is a drench gun.

* * * * *